United States Patent
Kim et al.

(10) Patent No.: US 9,647,774 B2
(45) Date of Patent: May 9, 2017

(54) METHOD FOR TRANSMITTING AND RECEIVING DATA ON THE BASIS OF ADAPTIVE BLIND INTERFERENCE ALIGNMENT

(71) Applicants: LG ELECTRONICS INC., Seoul (KR); INDUSTRY-ACADEMIC COOPERATION FOUNDATION, YONSEI UNIVERSITY, Seoul (KR)

(72) Inventors: Jinmin Kim, Anyang-si (KR); Jaehoon Chung, Anyang-si (KR); Dongku Kim, Seoul (KR); Jinyoung Jang, Seoul (KR); Hyukjin Chae, Seoul (KR); Sungyoon Cho, Seoul (KR); Hyunsoo Ko, Anyang-si (KR); Hyunsu Cha, Seoul (KR)

(73) Assignees: LG Electronics Inc., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 14/651,606

(22) PCT Filed: Dec. 12, 2013

(86) PCT No.: PCT/KR2013/011526
§ 371 (c)(1),
(2) Date: Jun. 11, 2015

(87) PCT Pub. No.: WO2014/092479
PCT Pub. Date: Jun. 19, 2014

(65) Prior Publication Data
US 2015/0333844 A1 Nov. 19, 2015

Related U.S. Application Data

(60) Provisional application No. 61/736,493, filed on Dec. 12, 2012.

(51) Int. Cl.
*H04B 1/00* (2006.01)
*H04B 15/00* (2006.01)
(Continued)

(52) U.S. Cl.
CPC ........... *H04B 15/00* (2013.01); *H04B 7/0413* (2013.01); *H04B 7/26* (2013.01); *H04B 7/2656* (2013.01);
(Continued)

(58) Field of Classification Search
CPC ..................................................... H04B 15/00
(Continued)

(56) References Cited

U.S. PATENT DOCUMENTS

2012/0058788 A1    3/2012    Papadopoulos et al.

FOREIGN PATENT DOCUMENTS

WO    WO 2011/014709 A1    2/2011
WO    WO 2012/040441 A1    3/2012

OTHER PUBLICATIONS

Wang et al., "Aiming Perfectly in the Dark—Blind Interference Alignment through Staggered Antenna Switching", IEEE Transactions on Signal Processing, vol. 59, Issue 6, Mar. 17, 2011, 28 pages.*

(Continued)

*Primary Examiner* — Nay A Maung
*Assistant Examiner* — Angelica M Perez
(74) *Attorney, Agent, or Firm* — Birch, Stewart, Kolasch & Birch, LLP

(57) ABSTRACT

A method and apparatus are presented for transmitting a signal in accordance with an adaptive blind interference alignment (BIA) scheme in a wireless access system. A transmitter configures a first block including desired signals and interference signals on the basis of a number of receivers within a cell and a number of reception modes of the (Continued)

receivers. Further, the transmitter configures a second block including either the desired signals or the interference signals, and configures alignment blocks for each of the receivers by combining the first block with the second block. The transmitter transmits the alignment blocks to the receivers in accordance with transmission symbol patterns corresponding to the alignment blocks. Symbol vectors included in the alignment blocks for each of the receivers are configured to be overlapped between the receivers.

10 Claims, 32 Drawing Sheets

(51) Int. Cl.
*H04W 56/00* (2009.01)
*H04B 7/26* (2006.01)
*H04B 7/0413* (2017.01)
*H04L 5/00* (2006.01)

(52) U.S. Cl.
CPC .......... *H04L 5/0023* (2013.01); *H04L 5/0073* (2013.01); *H04W 56/001* (2013.01)

(58) Field of Classification Search
USPC ................ 370/328, 436, 478; 455/63.1, 67.3
See application file for complete search history.

(56) References Cited

OTHER PUBLICATIONS

Wang et al., "Aiming Perfectly in the Dark—Blind Interference Alignment through Staggered Antenna Switching", IEEE Transactions on Signal Processing, vol. 59, Issue 6., Mar. 17, 2011, 28 pages.

Wang et al., "Design and Operation of Blind Interference Alignment in Cellular and Cluster-Based Systems", Information Theory and Applications Workshop (ITA), Feb. 6, 2011, 10 pages.

* cited by examiner

Structure of a receiver

FIG. 15

Tx precoding Matrix $$\begin{bmatrix} \tilde{I} & 0 \\ \tilde{I} & 0 \\ \tilde{I} & 0 \\ 0 & 0 \\ 0 & 0 \end{bmatrix} \quad \begin{bmatrix} \tilde{I} & 0 \\ 0 & \tilde{I} \\ 0 & 0 \\ \tilde{I} & 0 \\ 0 & \tilde{I} \end{bmatrix} \quad \tilde{I} = \begin{bmatrix} 1 & 0 & 1 \\ 0 & 1 & 0 \\ 0 & 0 & 0 \end{bmatrix}$$

$$y^{[1]} = \begin{bmatrix} h^{[1]}(1) & h^{[1]}(2) & h^{[1]}(3) & 0_{1\times 3} & 0_{1\times 3} \end{bmatrix} \underbrace{\begin{bmatrix} u_{11}^{[1]} \\ u_{11}^{[1]} \\ u_{13}^{[1]} \end{bmatrix}}_{rank=3} + \underbrace{\begin{bmatrix} \hat{h}^{[1]}(1) & 0_{1\times 3} & \hat{h}^{[1]}(2) & 0_{1\times 3} \\ 0_{1\times 3} & \hat{h}^{[1]}(1) & 0_{1\times 3} & \hat{h}^{[1]}(2) \\ 0_{1\times 3} & 0_{1\times 3} & & \end{bmatrix}}_{rank=2} \begin{bmatrix} u_{11}^{[1]} \\ u_{12}^{[1]} \\ u_{21}^{[1]} \\ u_{22}^{[1]} \end{bmatrix}$$

$$\hat{h}^{[1]}(1) = \begin{bmatrix} h_1^{[1]} & h_2^{[1]} & 0 \end{bmatrix}$$

Aligned Interference signal space $$\hat{h}^{[1]}(1) \begin{bmatrix} 1 \\ 0 \\ 0 \\ 1 \\ 0 \end{bmatrix} u_{11}^{[1]} + \hat{h}^{[1]}(2) \begin{bmatrix} 0 \\ 1 \\ 0 \\ 0 \\ 1 \end{bmatrix} u_2^{[2]}$$

$$u_2^{[2]} = \begin{bmatrix} u_{21}^{[2]} \\ u_{22}^{[2]} \\ 0 \end{bmatrix}$$

FIG. 20

| Time(T) | 1 | 2 | ··· | M-1 | M | ··· | | |
|---|---|---|---|---|---|---|---|---|
| UE1 | $u_1^{[1]}$ | $u_1^{[1]}$ | ··· | $u_1^{[1]}$ | | ··· | | |
| UE2 | $u_1^{[2]}$ | | ··· | | $u_1^{[2]}$ | ··· | $u_1^{[2]}$ | |

Symbol extension length of block 1

FIG. 23

| Time(T) | 1 | 2 | 3 | 4 | 5 | 6 | ... |
|---|---|---|---|---|---|---|---|
| UE1 | $u_1^{[1]}$ | $u_1^{[1]}$ | $u_2^{[1]}$ | $u_2^{[1]}$ | $u_3^{[1]}$ | $u_3^{[1]}$ | ... |
| UE2 | $u_1^{[2]}$ | $u_2^{[2]}$ | $u_1^{[2]}$ | $u_2^{[2]}$ | | | ... |
| UE3 | $u_1^{[3]}$ | | | | $u_1^{[3]}$ | | ... |

Block 1

Deficient alignment Block for UE3

| UE1 | | |
|---|---|---|
| UE2 | | |
| UE3 | $u_1^{[3]}$ | $u_1^{[3]}$ |

FIG. 30
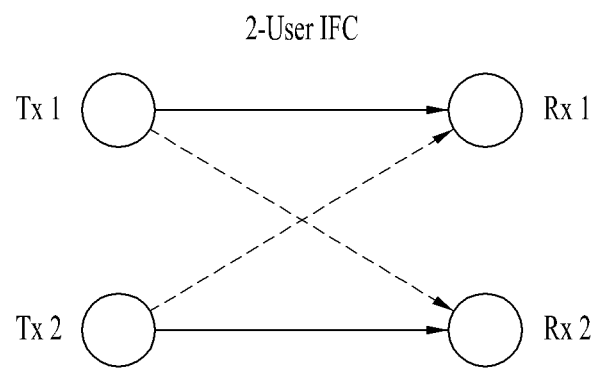
2-User IFC
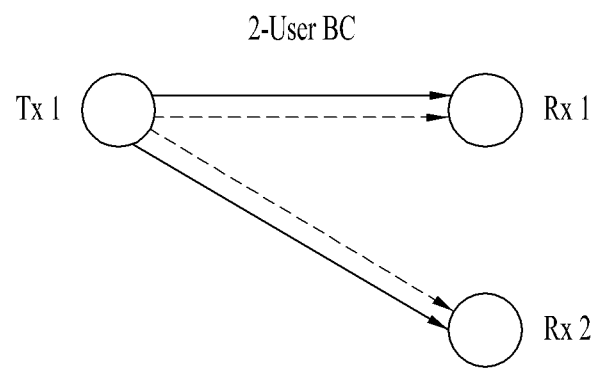
2-User BC
- - - → Interference signal
——→ Desired signal

FIG. 31

$$X = \underbrace{\begin{bmatrix} I_{3\times3} & 0_{3\times3} \\ I_{3\times3} & 0_{3\times3} \\ I_{3\times3} & 0_{3\times3} \\ 0_{3\times3} & 0_{3\times3} \\ 0_{3\times3} & 0_{3\times3} \end{bmatrix} \begin{bmatrix} u_{11}^{[1]} \\ u_{11}^{[1]} \\ u_{11}^{[1]} \\ 0 \\ 0 \\ 0 \end{bmatrix}}_{\text{Desired signal for UE 1}} + \underbrace{\begin{bmatrix} \tilde{I} & 0_{3\times3} \\ 0_{3\times3} & \tilde{I} \\ 0_{3\times3} & 0_{3\times3} \\ \tilde{I} & 0_{3\times3} \\ 0_{3\times3} & \tilde{I} \end{bmatrix} \begin{bmatrix} u_{11}^{[2]} \\ u_{12}^{[2]} \\ 0 \\ u_{21}^{[2]} \\ u_{22}^{[2]} \\ 0 \end{bmatrix}}_{\text{Desired signal for UE 2}}$$

METHOD FOR TRANSMITTING AND RECEIVING DATA ON THE BASIS OF ADAPTIVE BLIND INTERFERENCE ALIGNMENT

CROSS REFERENCE TO RELATED APPLICATIONS

This application is the National Phase of PCT International Application No. PCT/KR2013/011526, filed on Dec. 12, 2013, which claims priority under 35 U.S.C. 119(e) to U.S. Provisional Application No. 61/736,493, filed on Dec. 12, 2012, all of which are hereby expressly incorporated by reference into the present application.

TECHNICAL FIELD

The present invention relates to an adaptive blind interference alignment (BIA) method for controlling interference between users even without channel information in a wireless access system and an apparatus for supporting the same.

BACKGROUND ART

A wireless communication system has been widely developed to provide various kinds of communication services such as voice and data. Generally, the wireless communication system is a multiple access system that can support communication with multiple users by sharing available system resources (bandwidth, transmission power, etc.). Examples of the multiple access system include a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present invention is to provide a blind interference alignment (BIA) based transmission and reception algorithm for normalizing the number of switchable modes even if the number of switchable modes of a user equipment is different from the number of switchable modes of another user equipment.

Another object of the present invention is to provide a method for transmitting and receiving data based on blind interference alignment (BIA), which needs minimum symbol extension for a case where the number of symbol vectors is differently transmitted to each user equipment.

Still another object of the present invention is to provide a method for transmitting and receiving data based on blind interference alignment (BIA) even if the number of switchable modes is differently provided for each user equipment and the number of symbol vectors is differently transmitted to each user equipment.

Further still another object of the present invention is to provide a method for applying and extending methods suggested in the present invention to a method for controlling multi-cell interference.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention provides adaptive blind interference alignment (BIA) methods for controlling interference between users without channel information and devices for supporting the same.

In one aspect of the present invention, a method for transmitting a signal in accordance with an adaptive blind interference alignment (BIA) scheme in a wireless access system comprises configuring a first block including desired signals and interference signals, on the basis of the number of receivers within a cell and the number of reception modes of the receivers; configuring a second block including either the desired signals or the interference signals; configuring alignment blocks for each of the receivers by combining the first block with the second block; and transmitting the alignment blocks to the receivers in accordance with transmission symbol patterns corresponding to the alignment blocks.

In another aspect of the present invention, a transmitter for transmitting a signal in accordance with an adaptive blind interference alignment (BIA) scheme in a wireless access system comprises a transmission module; and a processor supporting the adaptive BIA scheme.

In this case, the processor is configured to configure a first block, which includes desired signals and interference signals, on the basis of the number of receivers within a cell and the number of reception modes of the receivers, configure a second block, which includes either the desired signals or the interference signals, configure alignment blocks for each of the receivers by combining the first block with the second block, and transmit the alignment blocks to the receivers by using the transmission module in accordance with transmission symbol patterns corresponding to the alignment blocks.

Preferably, symbol vectors included in the alignment blocks for each of the receivers are configured to be overlapped between the receivers if possible.

In this case, if a plurality of alignment blocks are configured in a specific one of the receivers, transmission symbol patterns for the plurality of alignment blocks are preferably configured not to be overlapped with one another.

Also, the first block has a length of $l_{block1}$ calculated as expressed by the following Equation, $$l_{block1} = \prod_{k=1}^{K} (m_k - 1), \qquad \text{[Equation]}$$

In this case, K represents the number of the receivers, and $m_k$ represents the number of reception modes of the kth receiver.

Also, the number of symbol vectors included in the first block is calculated as expressed by the following Equation, $$\# \text{ of symbols} = \frac{N_{block1}}{m_k - 1}, \qquad \text{[Equation]}$$

In this case, $N_{block1}$ represents the number of the first blocks.

Also, the second block has a length of $l_{block2}$ calculated as expressed by the following Equation, $$l_{block2} = \sum_{i=1}^{K} \frac{N_{block1}}{m_i - 1} = \sum_{i=1}^{K} \frac{\prod_{k=1}^{K}(m_k - 1)}{m_i - 1} = \left\{\prod_{k=1}^{K}(m_k - 1)\right\} \times \sum_{i=1}^{K} \frac{1}{m_i - 1},$$ [Equation]

In this case, $m_i$ represents the number of modes of the ith user equipment.

The aforementioned aspects of the present invention are only a part of the preferred embodiments of the present invention, and various embodiments reflected by technical features of the present invention may be devised and understood on the detailed description of the present invention, which will be described hereinafter, by the person with ordinary skill in the art.

Advantageous Effects

According to the embodiments of the present invention, the following advantages may be obtained.

First of all, an adaptive blind interference alignment (BIA) based transmission and reception algorithm for obtaining maximum degree of freedom regardless of a total number of switchable modes of each user equipment is provided.

Second, if the number of selectable modes of a user equipment is the same as the number of selectable modes of another user equipment, a method for transmitting and receiving data based on adaptive BIA is provided, which needs minimum symbol extension regardless of the number of symbol vectors transmitted to each user equipment.

Third, a method for transmitting and receiving data based on adaptive BIA is provided regardless of the number of switchable modes of each user equipment and the number of symbol vectors transmitted to each user equipment.

Finally, methods suggested in the present invention may be applied and extended to a method for controlling multi-cell interference.

It will be appreciated by persons skilled in the art that that the effects that could be achieved with the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 15 is a diagram illustrating an example of transmission precoding matrix based on a switching pattern described in FIGS. 13 and 14 as an embodiment of the present invention;

FIG. 16 is a diagram illustrating a method for controlling an interference signal by using an adaptive BIA scheme;

FIG. 20 is a diagram illustrating an example of a first block configured for two user equipments as an embodiment of the present invention;

FIG. 23 is a diagram illustrating a structure of a first block configured for an adaptive BIA scheme applied to three user equipments as an embodiment of the present invention;

FIG. 30 is a diagram illustrating that a transmitting signal is transmitted and received in a 2-user equipment IFC and 2-user equipment BC case as an embodiment of the present invention;

FIG. 31 is a diagram illustrating that received signals are represented by combination of desired signals of UE1 and UE2 as an embodiment of the present invention.

BEST MODE FOR CARRYING OUT THE INVENTION

Figure 1:
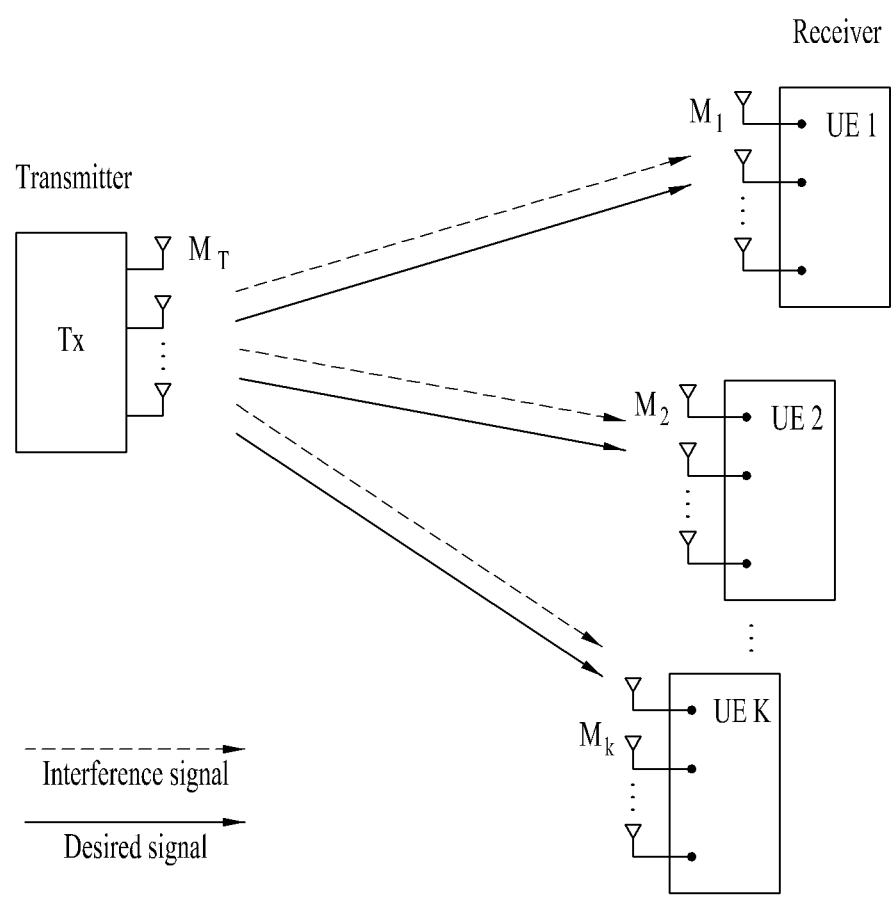
FIG. 1 is a diagram illustrating an example of a system that may be used in the embodiments of the present invention.

The embodiments of the present invention described in detail hereinafter disclose an adaptive blind interference alignment method for controlling interference between users without channel information in a wireless access system and devices for supporting the same.

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

In the description of drawings, processes or steps that may make the subject matter of the present invention obscure will not be disclosed. Also, processes or steps that may be understood by the person with ordinary skill in the art will not be disclosed.

In this specification, the embodiments of the present invention have been described based on the data transmission and reception between a base station and a mobile station. In this case, the base station means a terminal node of a network, which performs direct communication with the mobile station. A specific operation which has been described as being performed by the base station may be performed by an upper node of the base station as the case may be.

In other words, it will be apparent that various operations performed for communication with the mobile station in the network which includes a plurality of network nodes along with the base station may be performed by the base station or network nodes other than the base station. At this time, the base station (BS) may be replaced with terms such as a fixed station, Node B, eNode B (eNB), an advanced base station (ABS), and an access point (AP).

Also, in the embodiments of the present invention, a terminal may be replaced with the terms such as a user equipment (UE), a mobile station (MS), a subscriber station (SS), a mobile subscriber station (MSS), a mobile terminal and an advanced mobile station (AMS).

Furthermore, a transmitting end means a fixed or mobile node that transmits data services or voice services while a receiving end means a fixed or mobile node that receives data services or voice services. Accordingly, in an uplink, the mobile station could be the transmitting end while the base station could be the receiving end. Likewise, in a downlink, the mobile station could be the receiving end while the base station could be the transmitting end.

The embodiments of the present invention may be supported by standard documents disclosed in at least one of wireless access systems, i.e., IEEE 802.xx system, 3GPP system, 3GPP LTE system, and 3GPP2 system. Particularly, the embodiments of the present invention may be supported by documents 3GPP TS 36.211, 3GPP TS 36.212, 3GPP TS 36.213, 3GPP TS 36.321 and 3GPP 36.331. That is, among the embodiments of the present invention, apparent steps or parts which are not described may be described by the above standard documents. Also, all terminologies disclosed herein may be described by the above standard documents.

Hereinafter, the preferred embodiments of the present invention will be described with reference to the accompanying drawings. It is to be understood that the detailed description, which will be disclosed along with the accompanying drawings, is intended to describe the exemplary embodiments of the present invention, and is not intended to describe a unique embodiment with which the present invention can be carried out.

Also, specific terminologies hereinafter used in the embodiments of the present invention are provided to assist understanding of the present invention, and various modifications may be made in the specific terminologies within the range that they do not depart from technical spirits of the present invention.

The following technology may be applied to a variety of wireless access systems using code division multiple access (CDMA), frequency division multiple access (FDMA), time division multiple access (TDMA), orthogonal frequency division multiple access (OFDMA), single carrier frequency division multiple access (SC-FDMA), and the like.

CDMA may be embodied through radio technology such as universal terrestrial radio access (UTRA) or CDMA2000. TDMA may be embodied through radio technology such as global system for mobile communications (GSM)/general packet radio service (GPRS)/enhanced data rates for GSM evolution (EDGE). OFDMA may be embodied through radio technology such as institute of electrical and electronics engineers (IEEE) 802.11 (Wi-Fi), IEEE 802.16 (Wi-MAX), IEEE 802-20, and evolved UTRA (E-UTRA).

UTRA is a part of a universal mobile telecommunications system (UMTS). 3GPP LTE is a part of evolved UMTS (E-UMTS) using E-UTRA. 3GPP LTE employs OFDMA in DL and SC-FDMA in UL. LTE-advanced (LTE-A) is an evolved version of 3GPP LTE. For clarity of description of technical features of the present invention, the embodiments of the present invention will be described based on the 3GPP LTE/LTE-A system but may be applied to IEEE 802.16e/m system.

1. Blind Interference Alignment (BIA) Scheme

The BIA scheme is a method that eliminates interferences between users without receiving feedback of channel information from a transmitter (for example, a base station) and/or a receiver (for example, a user equipment).

It is assumed that a user equipment to which the BIA scheme is applied is a user equipment having a reconfigurable antenna that may make several electromagnetic patterns through one antenna. Also, different beam patterns that may be made by the reconfigurable antenna will be referred to as 'mode'. For example, one reconfigurable antenna may make two or more different beam patterns, and may use the patterns adaptively through switching. Hereinafter, the BIA scheme will be described.

In the BIA scheme, the transmitter and all the receivers that have received data from the transmitter jointly design transmission symbol patterns of the transmitter and receiving mode switching patterns of the receiver on an off-line to transmit and receive data. At this time, the transmitter and/or the receiver designs the receiving mode switching pattern and determines the transmission symbol pattern corresponding to the receiving mode switching pattern.

1.1 Basic Principle of Operation of Transmitter and Receiver (1) The receiver (for example, the user equipment) performs mode switching M times to receive its desired M×1 data. That is, the receiver obtains spatial resources (rank), which may be decoded, by receiving symbol vectors (that is, desired signals) through different channels of M times.

(2) The receiver receives interference symbol vectors through the same channel by maintaining a certain mode equally when receiving the interference signals, to minimize a spatial resource where the interference signals are processed.

(3) That is, when a specific receiver receives a desired symbol vector, the other receivers perform a switching operation to receive data in the same mode.

1.2 System Model

FIG. 1 is a diagram illustrating an example of a system that may be used in the embodiments of the present invention.

In the embodiments of the present invention, a single cell multi-user broadcast channel is considered, which includes a single transmitter having $M_T$ number of transmitting antennas and K number of receivers having $M_k$ (k ∈ {1, 2, . . . K}) number of receiving antennas as shown in FIG. 1. In FIG. 1, dotted lines means interference signals, and solid lines mean desired signals to be received by the receiver.

Referring to FIG. 1, since all the receivers use the same frequency band, they receive interference signals and a desired signal. It is assumed that each receiver has one or more reconfigurable antennas that may adaptively select modes of different channel properties.

Figure 2:
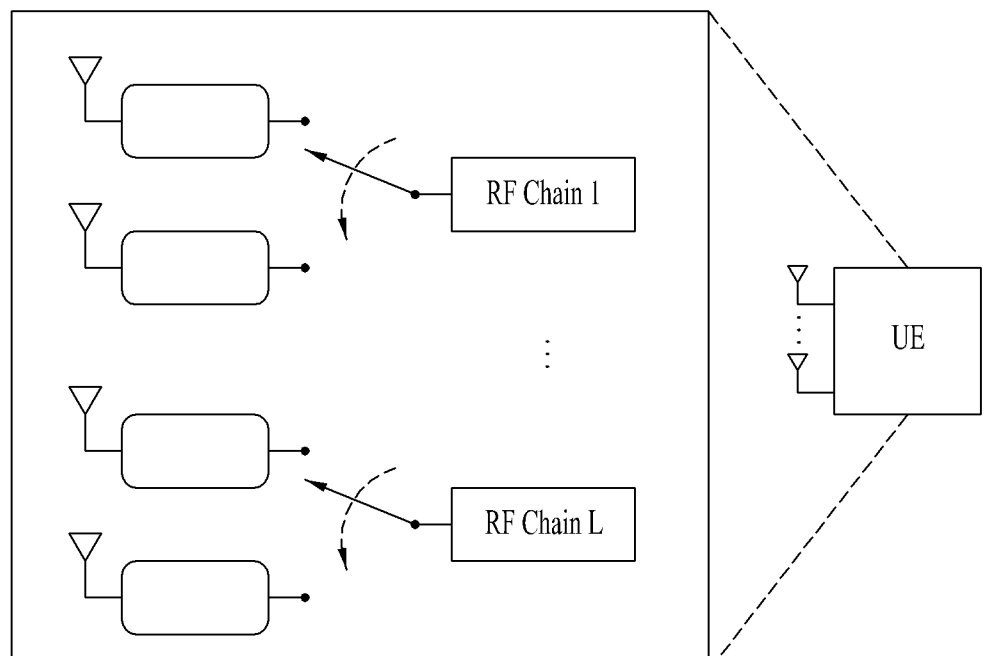
FIG. 2 is a conceptual diagram illustrating a reconfigurable antenna that may be used in the embodiments of the present invention.

FIG. 2 is a conceptual diagram illustrating a reconfigurable antenna that may be used in the embodiments of the present invention.

Referring to FIG. 2, an antenna switching scheme of a user equipment is considered, wherein the user equipment includes a total $L_k$ number of radio frequency chains and $M_k$ number of antennas. However, it does not matter that the base station has no reconfigurable antenna. A received signal received by the kth user equipment at a random time t may be expressed by the following Equation 1.

$$y^{[k]}(t) = H^{[k]}(m(t))x(t) + z^{[k]}(t) \quad \text{[Equation 1]}$$

In this case, $z^{[k]}(t) \in \pounds^{M_k \times 1}$ is a complex Gaussian noise, a matrix $H^{[k]}(m(t)) \in \pounds^{L_k \times M_T}$ is a channel for a reconfigurable mode of the kth user equipment. It is assumed that $H^{[k]}(m(t))$ is a block fading channel having a certain value for each m(t). In order to describe the BIA scheme, it is considered that the number of antennas of all the transmitters and receivers is M and the number of RF chains of each user equipment is L=1. In this case, since the user equipment uses a single RF chain only, a broadcast channel between the base station and the kth user equipment is 1×M vector channel $h_j$(K-user BC). At this time, a broadcast message, multicast message and/or unicast message may be transmitted to the broadcast channel (BC).

The most basic principle for aligning interference in the transmitter without channel information is as follows. When the receiver receives a desired signal, each data stream is made to experience different channels by mode switching, and the interference signals are made to experience the same channel with the data stream. As a result, when a specific receiver performs mode switching, it is preferable that modes of the receivers are maintained uniformly. This will be described in detail with reference to FIGS. 3 to 7.

Figure 3:
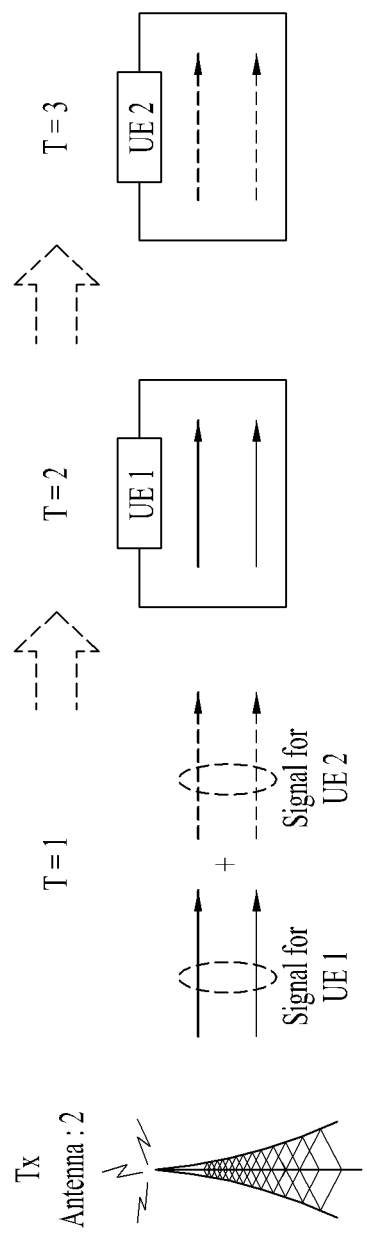
FIG. 3 is a diagram illustrating an example of a method for transmitting and receiving a signal in a system to which a BIA scheme is applied, which may be used in the embodiments of the present invention.

FIG. 3 is a diagram illustrating an example of a method for transmitting and receiving a signal in a system to which a BIA scheme is applied.

The system disclosed in FIG. 3 relates to a system that includes a receiver which is able to select a single RF chain and two modes (that is, M=2, L=1), and a transmitter having two antennas. However, it is assumed that the transmitter includes RF chains and antennas, wherein the number of RF chains is the same as the number of antennas. Also, it is assumed that the transmitter is a base station and the receiver is a user equipment.

Referring to FIG. 3, the base station transmits four independent symbols for three symbol transmission periods (T=1, 2, 3). For example, the base station transmits signals (that is, two independent symbols) for two user equipments for the first symbol transmission period, and then transmits a desired signal to each receiver once for the second and third symbol periods. In FIG. 3, the solid lines are desired signals for the first user equipment (UE1), and dotted lines are desired signals for the second user equipment (UE2). The desired signal for each user equipment act as an interference signal for another user equipment.

Figure 4:
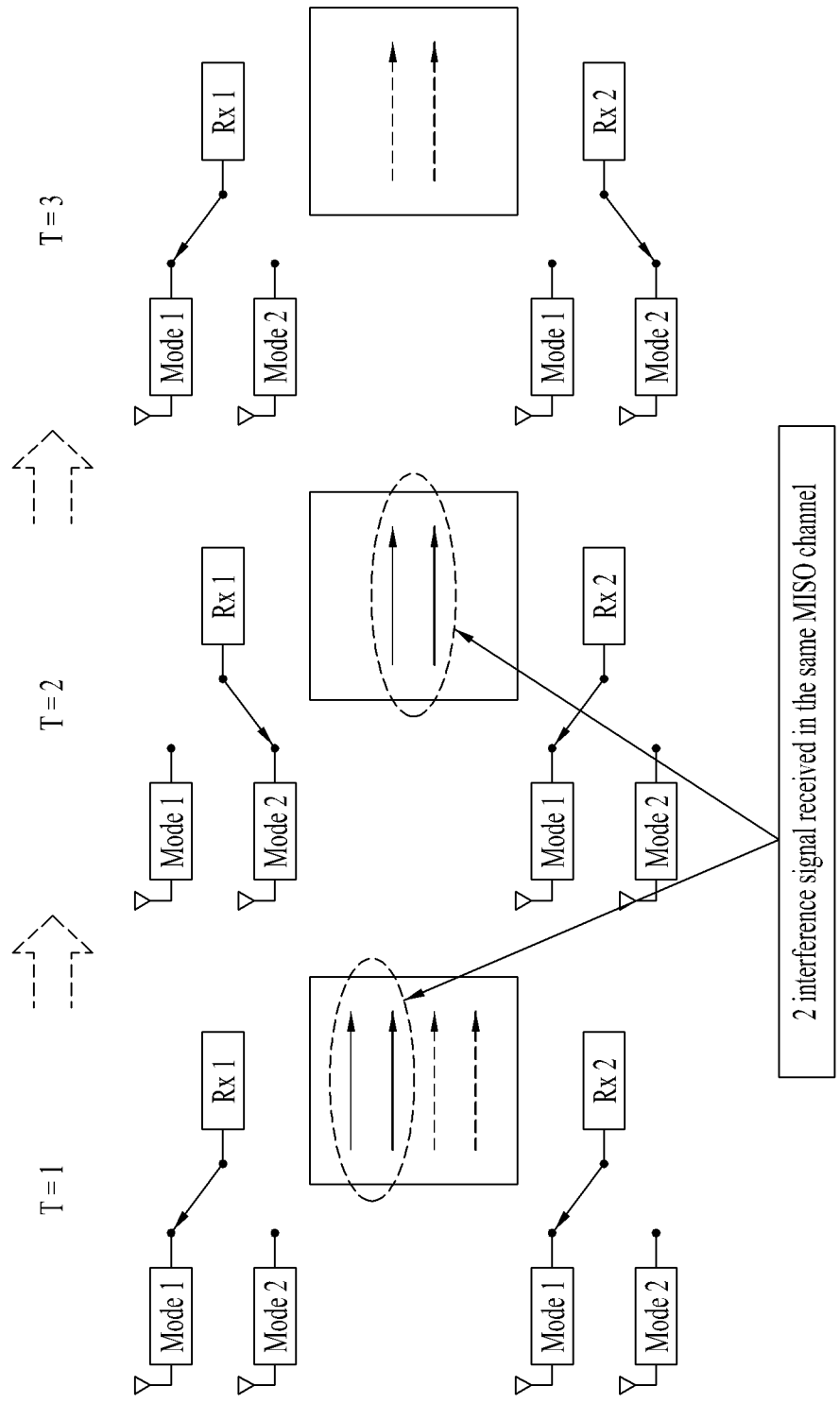
FIGS. 4 and 5 are diagrams illustrating that transmission symbols shown in FIG. 3 are reconfigured in view of each receiver.
Figure 5:
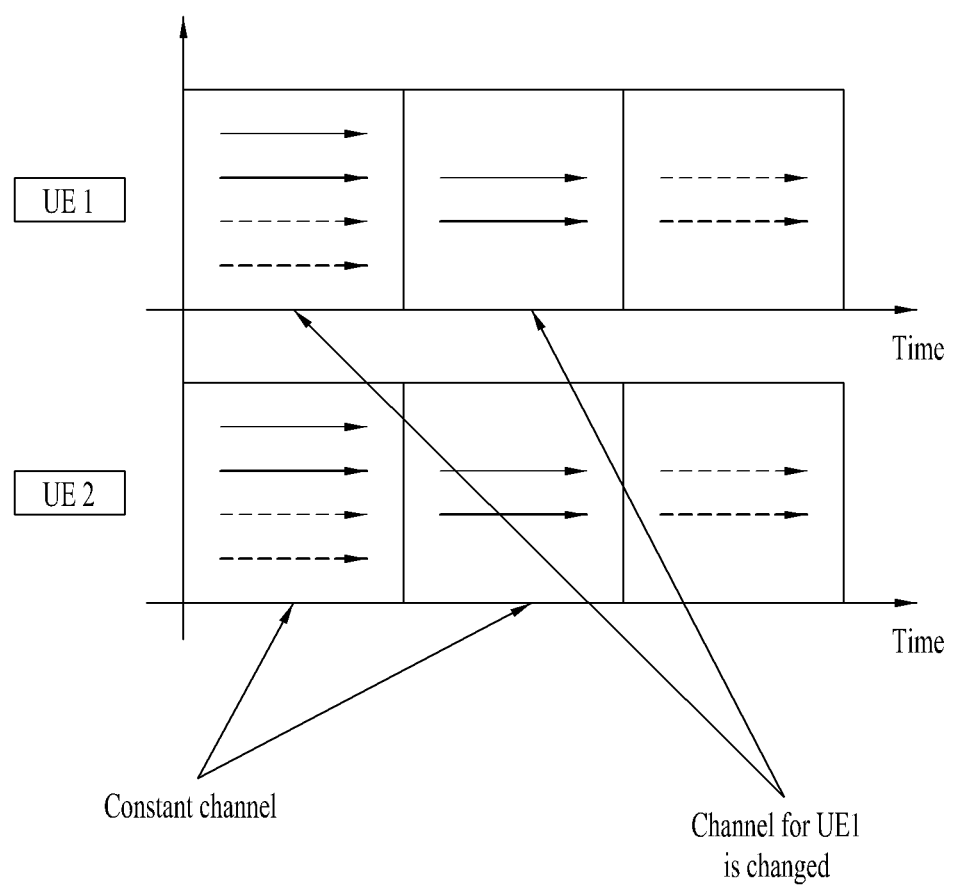

FIGS. 4 and 5 are diagrams illustrating that transmission symbols shown in FIG. 3 are reconfigured in view of each receiver;

In the BIA scheme, a transmission mode is determined depending on a mode switching pattern. Each of the user equipments UE1 and UE2 which are receivers has a switching pattern as shown in FIG. 4 for the symbol transmission periods of three times. The receiving antenna Rx1 of the first user equipment UE1 continues to perform mode switching, and the receiving antenna Rx2 of the second user equipment UE2 switches a receiving mode for the third symbol transmission period only. As a result, when a channel of one user equipment is changed as shown in FIG. 5, a channel of another user equipment has a switching pattern which is not changed.

Figure 6:
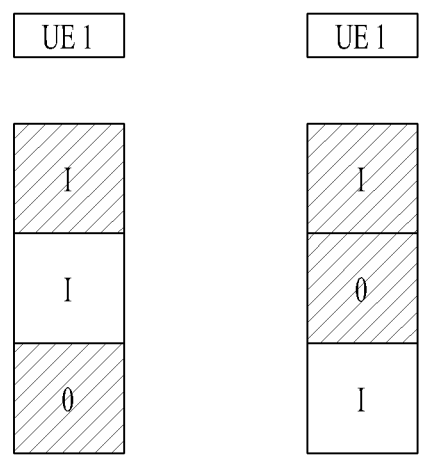
FIG. 6 is a diagram illustrating an example of a precoding matrix that may be used in the embodiments of the present invention.

FIG. 6 is a diagram illustrating an example of a precoding matrix used by a precoder of a transmitter (that is, a base station).

Referring to FIG. 6, when each user equipment switches a mode to the pattern of FIG. 4, a precoding matrix applied to a desired signal transmitted from the base station to each user equipment may be identified. A channel of the first user equipment UE1 has been changed for the first two symbol periods, and since mode switching does not occur for the channel of the second user equipment, the same channel is maintained.

The UE1 obtains a spatial resource for decoding the desired signal by receiving the desired signal through different modes for the symbol transmission periods of three times, and the UE2 receives an interference signal in the same mode to process the interference signal. That is, since the UE2 receives the desired signal and the interference signal for the first symbol transmission period but receives only the interference signal through the same channel for the second symbol transmission period, the UE2 may detect the desired signal by subtracting the corresponding interference signal from the first received signal.

In the embodiments of the present invention, the mode switching pattern of the UE1 and the UE2 for the symbol transmission periods will be referred to as an alignment block (AB) for the UE1. Also, as the same principle, the mode switching pattern of the two user equipments for the second and third symbol periods of FIG. 5 will be referred to as an alignment block (AB) for the UE2.

The transmission message pattern for the symbol transmission periods of three times may be expressed by the following Equation 2.

$$X = \begin{bmatrix} I \\ I \\ 0 \end{bmatrix} \begin{bmatrix} u_1^{[1]} \\ u_2^{[1]} \end{bmatrix} + \begin{bmatrix} I \\ 0 \\ I \end{bmatrix} \begin{bmatrix} u_1^{[1]} \\ u_2^{[1]} \end{bmatrix} \quad \text{[Equation 2]}$$

In this case, the received signal of the UE1 may be expressed by the following Equation 3.

$$\begin{bmatrix} y^{[1]}(1) \\ y^{[1]}(2) \\ y^{[1]}(3) \end{bmatrix} = \begin{bmatrix} h^{[1]}(1) \\ h^{[1]}(2) \\ 0_{1\times 2} \end{bmatrix} \begin{bmatrix} u_1^{[1]} \\ u_2^{[1]} \end{bmatrix} + \begin{bmatrix} h^{[1]}(1) \\ 0_{1\times 2} \\ h^{[1]}(1) \end{bmatrix} \begin{bmatrix} u_1^{[2]} \\ u_2^{[2]} \end{bmatrix} + \begin{bmatrix} z^{[1]}(1) \\ z^{[1]}(2) \\ z^{[1]}(3) \end{bmatrix} \quad \text{[Equation 3]}$$

The two interference signals $u_1^{[1]}$, $u_2^{[1]}$ from the Equation 3 are aligned in a vector direction of rank 1, and the desired signal has linear independency based on a matrix of rank 2. Therefore, it is noted that the two received signals of each user equipment may be detected. If it is assumed that there is no noise, the signals received by the UE1 for the third symbol transmission period are interference signals, whereby the UE1 may decode all of the desired signals by subtracting the third received signal from the first received signals.

Figure 7:
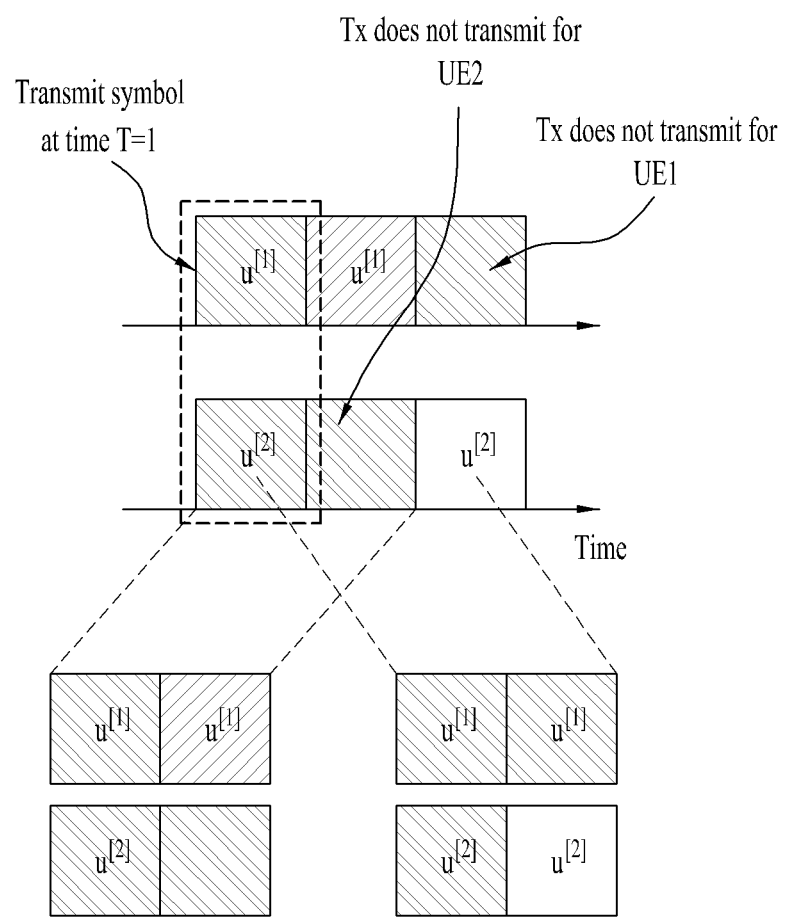
FIG. 7 is a diagram illustrating that methods described in FIGS. 4 and 5 are expressed in a symbol unit.

FIG. 7 is a diagram illustrating that methods described in FIGS. 4 and 5 are expressed in a symbol unit.

Referring to FIG. 7, the UE1 may configure the AB by using transmission symbols received for the first transmission period (T=1) and the transmission symbols received for the second transmission period (T=2). Also, the UE2 may configure the AB by using transmission symbols received for the first transmission period and the third transmission period (T=3).

The BC of two user equipments has been described as above when two modes are switched. In case of switching of two modes, symbol extension of three times is required. However, if the number of modes is increased a little under 2-UE BC status, a symbol extension length required for BIA is increased in a very great range. For example, a case of four modes will be described.

Figure 8:
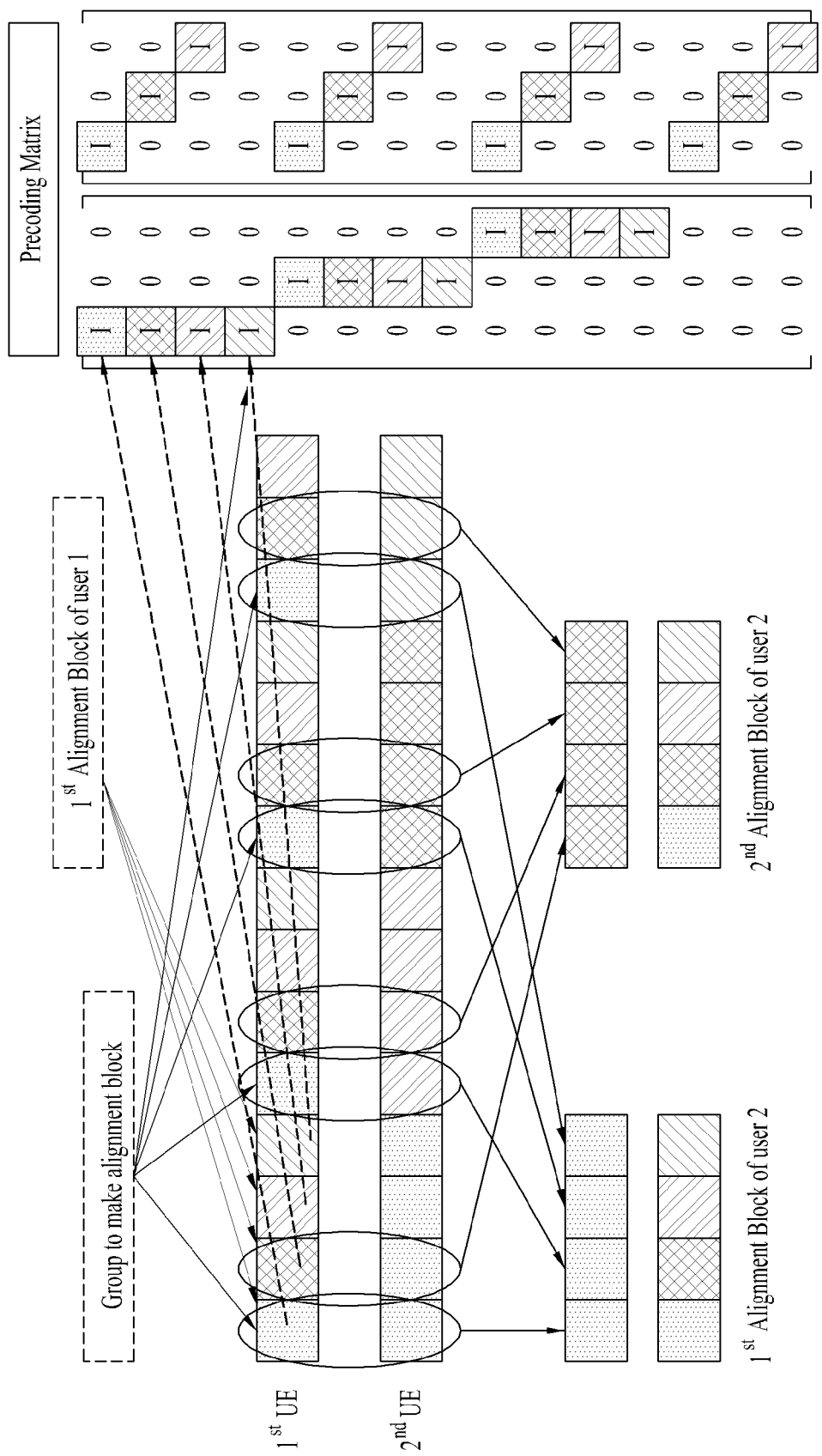
FIG. 8 is a diagram illustrating a BIA scheme when a switchable mode is 4 as an embodiment of the present invention.

FIG. 8 is a diagram illustrating a BIA scheme when a switchable mode is 4 as an embodiment of the present invention.

Hereinafter, it is assumed that a 2-user equipment BC includes a receiver (M=4, L=1), which may select a single RF chain and four modes, and a transmitter having four antennas. In this case, FIG. 8 relates to a method for transmitting 12 data streams to each user equipment through symbol extension of 15 times based on a mode switching pattern. Through symbol extension of 15 times, the base station may obtain a degree of freedom of 1.6 by transmitting 12 data streams to each user equipment. The obtained degree of freedom of 1.6 is higher than a degree of freedom, which may be obtained when existing time/frequency resources are used divisionally in an orthogonal mode, as much as 1.6 times.

In view of the UE1, the UE1 continues to perform mode switching for first symbol transmission periods of four times, whereas the UE2 maintains the same channel without mode switching. Therefore, a mode switching pattern for the first symbol transmission periods of four times determines the first alignment block (AB) of the UE1. In accordance with this principle, next four symbol periods become the second AB of the UE1, and a total of three ABs are configured.

On the other hand, in view of the UE2, the first, fifth, ninth and thirteenth symbol transmission periods become the first AB. In accordance with the same principle, a total of three ABs are configured as ABs of the UE2. The transmitter and/or the receiver may design a transmission precoding matrix by arranging a unit matrix in a precoding matrix as shown in FIG. 8 based on the above configuration.

Supposing that the unit matrix and a zero matrix are as one block row, a block row reserved by the unit matrix in the entire precoding matrix corresponds to a symbol transmission period of the entire symbol extension length, wherein the symbol transmission period configures AB of each user equipment. Also, the number of block columns means a total number of ABs. In the embodiments of the present invention, it is assumed that three ABs are configured for each user equipment. Therefore, it is noted that the precoding matrix includes three block rows.

When the transmitter uses a precoder shown in FIG. 8, the UE1 receives data in a mode displayed in a unit matrix of FIG. 8. That is, the UE1 receives 4×1 symbol vectors, which include four data streams desired to be received by the UE1, in different modes of four times, while the UE2 may align four data streams one-dimensionally by receiving the same symbol vectors in the same mode. Each user equipment may remove aligned interference in accordance with a zero-forcing scheme or remove signals that include interference signals only, from signals that include interference signals and desired signals, which are received together, thereby detecting the desired signals.

1.3 BIA Theory

As described above, in the method for transmitting and receiving data based on BIA, a symbol extension length which is required and the number of data streams transmitted to each user are determined in accordance with the number K of receivers (for example, user equipments) and the number M of modes.

Supposing that each user equipment performs M number of selectable mode switching through a single RF chain (L=1) in MISO-BC of K number of receivers within a single cell, a necessary symbol extension length l, the number of data streams which are transmitted, and degree of freedom (DoF) are expressed by the following Equations 4 and 5.

$$l = (M-1)^K + K(M-1)^{K-1} \quad \text{[Equation 4]}$$

$$DoF = \frac{KM(M-1)^{K-1}}{(M-1)^K + K(M-1)^{K-1}} = \frac{MK}{M+K-1} \quad \text{[Equation 5]}$$

When the base station transmits data to K number of user equipments, it is assumed that each user equipment receives a total of M number of desired data streams and receives M(K−1) number of interference signals. In this case, each user equipment may use M-dimension to decode the M number of desired signals, and may remove M(K−1) number of interference signals by aligning the interference signals (K−1)-dimensionally.

As a result, each user equipment aligns one M×1 interference symbol vector, which is transmitted to another user equipment, one-dimensionally. To this end, each user equipment allows each data stream to be made to experience its respective channel different from those of the other data streams through mode switching when receiving desired signals, and allows interference signals to be made to experience the same channel. As described above, when a specific user equipment performs mode switching, it is preferable that modes of the other user equipments are maintained uniformly.

For example, the symbol extension length is calculated as follows using the Equations 4 and 5. In order to transmit data to four user equipments (K=4, M=4) of mode 4, a symbol extension length l of 189 should be assured.

However, it is realistically difficult for four user equipments to uniformly maintain channels for a symbol extension length time. In order to actually use the BIA scheme in a wireless communication system, since a coherence time for assuring a uniform channel environment is varied for each receiver, the BIA scheme should be implemented adaptively considering the channel environment of each receiver. Also, the BIA scheme conventionally defined may be applied to a case where the receiver has a single RF-chain only and the number of antennas of the base station should be the same as the number of antennas of all user equipments. Therefore, the conventional BIA scheme may be used under a restricted environment only.

2. Adaptive BIA

A multi-user multiple input multiple output (MU-MIMO) scheme which is currently used in the LTE/LTE-A system is one of latest MIMO techniques for high speed communication. The MU-MIMO technique is a method for remarkably increasing a transmission rate by effectively using channel information between a user equipment and a base station.

However, in a current cellular system that uses digital feedback, feedback bits equivalent to $\alpha \log_2$ (SNR) are required for each user equipment to obtain ideal transmission rate throughput even approximately. Also, in the current system in which available feedback resources are restricted, a transmission rate is little increased at a signal to noise ratio (SNR) of a certain level or more.

Despite that the transmitter does not receive channel information from the receivers, the BIA scheme which is a scheme for efficiently controlling interference between users inside a single cell may obtain degree of freedom (DoF) higher than that of the existing scheme that orthogonally uses time or frequency resources. Also, the BIA scheme may obtain degree of freedom similar to that of a case where channel information is known perfectly even in the case that users are increased infinitely within a specific cell.

However, in the aforementioned BIA scheme, a necessary symbol extension length becomes too long as the number of users (for example, user equipments), that is, the number of antennas of each user equipment is increased, whereby it is difficult to actually apply the BIA scheme to the wireless system. Also, if the aforementioned BIA scheme is used, the number of antennas of the base station should be the same as the number of antennas of all user equipments, and since data are transmitted to always maximize DoF, it is difficult to perform adaptive data transmission based on a channel environment of each user equipment and QoS (Quality of Service) required by each user equipment.

Therefore, the embodiments of the present invention, which will be described hereinafter, relate to three adaptive BIA schemes as follows.

(1) A transmission and reception scheme is provided, which may acquire maximum DoF in accordance with an adaptive BIA scheme by normalizing the number of switchable modes when the number of switchable modes of each user equipment is the same as or different from the number of switchable modes of another user equipment. In this case, a method for transmitting and receiving data based on adaptive BIA may be provided even in the case that the number of antennas of each receiver is different from the number of antennas of another receiver. Therefore, the transmission and reception scheme may be applied to transmission and reception of various wireless communications such as communication between devices as well as communication between mobile communication user equipments.

(2) The number of symbols received by each user equipment may be varied depending on the number of user equipments within a cell and the number of antennas of each user equipment. The number of symbol vectors transmitted to the user equipments is normalized, whereby an adaptive BIA based transmission and reception scheme, which requires minimum symbol extension only, is provided. That is, the user equipment and/or the base station may adaptively transmit and receive a radio signal by considering channel environments of the user equipments and the amount of data which are required.

(3) In the case that the number of switchable modes of the user equipment is normalized and the number of symbol vectors transmitted to each user is also normalized, an adaptive BIA based transmission and reception scheme, which requires minimum symbol extension only, is provided. As a result, even though antenna configurations of the user equipments are different from one another and channel coherence times assured by each user equipment are different from one another, the adaptive BIA based transmission and reception scheme may be used through minimum symbol extension only.

3. Adaptive BIA Scheme of Normalized Receiving Antenna Configuration

The embodiment of the present invention, which will be described hereinafter, relates to a method for implementing an adaptive BIA scheme when the number of available modes of each receiver is different from the number of available modes of another receiver.

It is assumed that the kth user equipment has $L_k$ number of RF chains and $M_k$ number of receiving antennas even in the adaptive BIA scheme in the same manner as the system model shown in FIGS. 1 and 2. In this case, the number of switching modes of each user equipment is $$m_k = \left\lceil \frac{M_k}{L_k} \right\rceil,$$

and channels substantially configured between the transmitter and the receiver are $L_k \times M_k$. However, it is assumed that the number $M_t$ of antennas of the transmitter satisfies $$M_T \geq \max_{\forall k}\{M_k\}.$$

3.1 Design of Receiving Mode Switching Pattern

First of all, a receiving mode switching pattern and a transmission symbol pattern, which are shown in FIG. 7, will be described. Referring to FIG. 7, although a symbol vector $u_1^{[1]}$ for UE1 is repeatedly transmitted to AB for the UE1, there may be an AB where a symbol vector for UE2 is not transmitted. All of the ABs have the above structure. That is, there may be a block where a symbol vector transmitted from each AB is transmitted without being overlapped with another symbol. The signal transmitted without being overlapped with another signal is an interference signal for the other user equipments not a target user equipment, and is used to identify a desired signal and the interference signal from each other.

For example, the kth receiver should repeatedly receive $M_k \times 1$ symbol vector $M_k$ times. However, if the kth receiver has already received data repeatedly in $M_k-1$ number of modes, the receiver has only to additionally receive the symbol vector in the other one mode only which is not used. However, as described above, the interference signal (or interference symbol) or the desired signal (or desired symbol) should be received in all the ABs without being overlapped with each other at least once.

When considering the mode switching pattern of all the user equipments based on the above principle, a symbol transmission period where only one symbol should be transmitted without being overlapped with another symbol for the entire symbol transmission block will be defined as a second block (block 2), and the other periods designed to overlap the ABs if possible will be defined as a first block (block 1).

If a period where a specific user equipment receives symbols by using the last mode is defined as a second block, the second block is determined automatically as the first block is determined. Therefore, when the mode switching pattern and the transmission symbol pattern are designed, it is very important that the first block is designed appropriately.

3.2 Method for Designing a First Block

The method for designing a first block follows the following rules.

(1) When a target user equipment receives data through mode switching per symbol transmission period to receive a desired signal, the other receivers are maintained at a certain mode.

(2) The ABs for each receiver are designed to be overlapped with one another if possible to reduce a symbol extension length within a maximum range. For example, in FIG. 7, it is noted that the first symbol transmission period may be included in the AB for the UE1 but may be included in the AB for the UE2.

(3) When a plurality of ABs are generated to transmit a plurality of symbol vectors to a specific user equipment, ABs for the same user equipment are designed not to be overlapped with one another. This is because that N number of ABs for one user equipment are intended to transmit N number of different $M_k \times 1$ symbol vectors. Only one $M_k \times 1$ symbol vector may be transmitted to and received by one AB.

Figure 9:
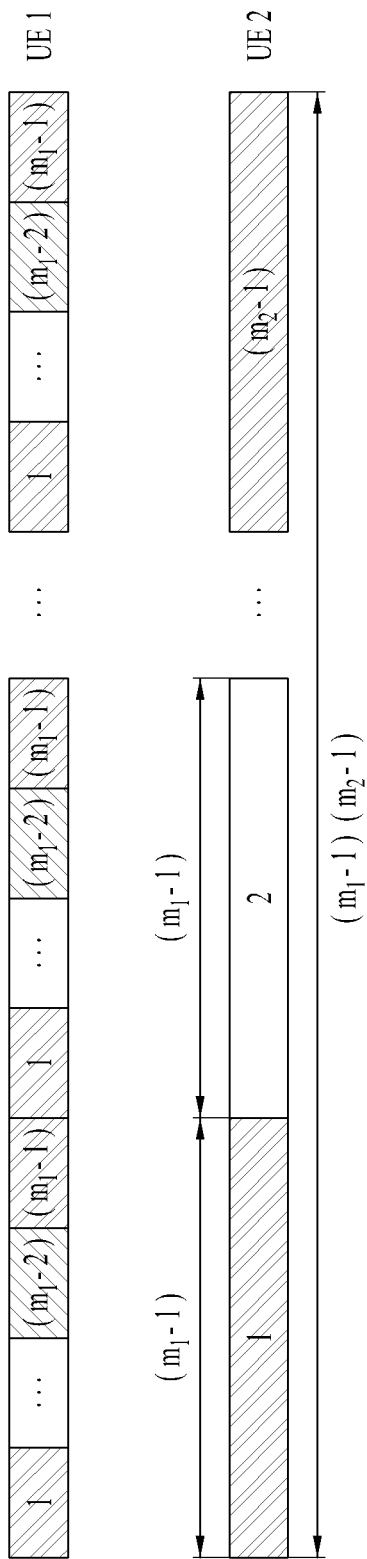
FIG. 9 is a diagram illustrating one of methods for configuring a first block as an embodiment of the present invention.

A mode switching pattern corresponding to the first block (block 1) of two user equipments of which modes are $m_1$ and $m_2$ will be designed based on the above rules as shown FIG. 9.

FIG. 9 is a diagram illustrating one of methods for configuring a first block as an embodiment of the present invention.

Referring to FIG. 9, since the first user equipment UE1 performs mode switching per every symbol transmission period, the switching pattern is repeated at a period of $m_1-1$. At this time, the second user equipment UE2 performs mode switching per one period of the mode switching pattern of the UE1. Since the number of modes used by the UE2 in the first block is $m_2-1$, the first block has a length of $(m_1-1)(m_2-1)$ as shown in FIG. 9.

Figure 10:
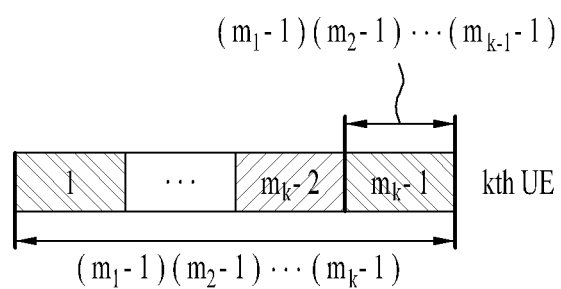
FIG. 10 is a diagram illustrating an example of an alignment block as an embodiment of the present invention.

Therefore, the mode switching pattern (that is, alignment block) of the kth user equipment among a total of K number of user equipments may be configured as shown in FIG. 10.

Figure 11:
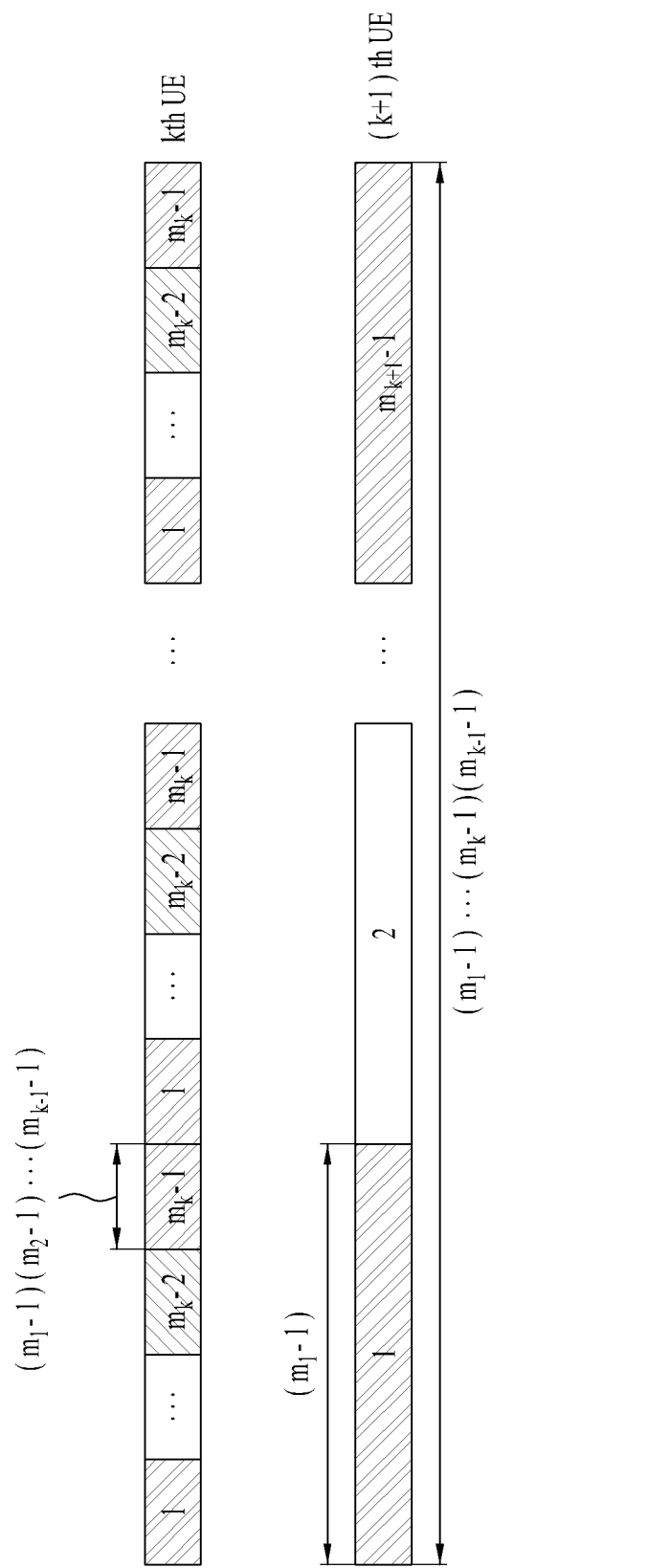
FIG. 11 is a diagram illustrating a structure of a first block based on an alignment block.

FIG. 10 is a diagram illustrating an example of an alignment block as an embodiment of the present invention, and FIG. 11 is a diagram illustrating a structure of a first block based on the alignment block.

Referring to FIG. 10, the kth user equipment should maintain a certain mode for an alignment block period $(m_1-1)(m_2-1) \ldots (m_{k-1}-1)$. As a result, when each user equipment has a mode of $m_1$, the structure of the first block for the k number of user equipments is as shown in FIG. 11. At this time, the length of the first block may be expressed by the following Equation 6.

$$l_{block1} = \prod_{k=1}^{K} (m_k - 1) \quad \text{[Equation 6]}$$

In the Equation 6, $l_{block1}$ represents the length of the first block, K is a total number of user equipments within a cell, and $m_k$ is the number of modes of the kth user equipment.

3.3 Method for Designing a Second Block

If the first block for ABs is determined, the second block may be determined easily. Since a part of the ABs has been designed using a mode $m_k-1$ in the first block, the second block acts as the last mode (last symbol) of each AB. Therefore, the last mode is added behind the first block, which is determined, for each user equipment, as much as the number of ABs (the number of symbol vectors).

At this time, although the symbol vectors transmitted from the second block are required even when the target user equipment detects a signal, the symbol vectors are used even by another user equipment to remove interference signals. Therefore, it is preferable that the symbol vectors transmitted from the second block are transmitted without being mixed with the other data symbols.

The symbol extension length, which is finally required, the number of data streams which will be transmitted, and DoF, which is desired to be achieved, may be determined, as follows, using the first block and the second block.

At the first block, the receiver k receives symbol vectors, which are required, $m_k-1$ times. Therefore, the receiver k receives the symbol vectors, which are received at the first block, at the second block once more. The number of symbol vectors which are received by the receiver k at the first block and required to remove interference may be expressed by the following Equation 7.

$$\text{\# of symbols} = \frac{N_{block1}}{m_k - 1} \quad \text{[Equation 7]}$$

In the Equation 7, $N_{block1}$ represents the number of the first blocks.

Therefore, the number (that is, length $l_{block2}$ of the second block) of the symbol vectors which should be received by every receiver once more may be expressed by the following Equation 8, and considering the lengths of the first block and the second block, the entire symbol extension length $l_{symext}$ which is required may be expressed by the following Equation 9.

$$l_{block2} = \sum_{i=1}^{K} \frac{N_{block1}}{m_i - 1} = \sum_{i=1}^{K} \frac{\prod_{k=1}^{K}(m_k - 1)}{m_i - 1} =$$

$$\left\{\prod_{k=1}^{K}(m_k - 1)\right\} \times \sum_{i=1}^{K} \frac{1}{m_i - 1}$$

[Equation 8]

$$l_{symext} = l_{block1} + l_{block2} = \prod_{k=1}^{K}(m_k - 1)\left\{\prod_{k=1}^{K}(m_k - 1)\right\} \times$$

$$\sum_{i=1}^{K} \frac{1}{m_i - 1} = \left\{\prod_{k=1}^{K}(m_k - 1)\right\} \times$$

$$\left\{1 + \prod_{i=1}^{K} \frac{1}{(m_i - 1)}\right\}$$

[Equation 9]

In the Equations 8 and 9, $m_k$ represents the number of modes of the kth user equipment, $m_i$ represents the number of modes of the ith user equipment.

At this time, the number of a total of data streams which are transmitted may be obtained by the following Equation 10 in such a manner that the number of symbol vectors received by each receiver as expressed by the Equation 7 may be multiplied by the size $M_k \times 1$ of each symbol vector.

$$l_{sym} = \sum_{i=1}^{K}\left\{\left\{\prod_{k=1}^{K}(m_k - 1)\right\}\frac{M_i}{m_i - 1}\right\} = \left\{\prod_{k=1}^{K}(m_k - 1)\right\} \times$$

$$\sum_{i=1}^{K} \frac{M_i}{m_i - 1}$$

[Equation 10]

Also, DoF, which is desired to be finally achieved, may be calculated using the Equations 9 and 10, and is obtained as expressed by the following Equation 11.

$$DoF = \frac{N_{sym}}{N_{symext}} = \frac{\left\{\prod_{k=1}^{K}(m_k - 1)\right\} \times \sum_{i=1}^{K}\frac{M_i}{m_i - 1}}{\left\{\prod_{k=1}^{K}(m_k - 1)\right\} \times \left\{1 + \prod_{i=1}^{K}\frac{1}{m_i - 1}\right\}} =$$

$$\frac{\sum_{i=1}^{K}\frac{M_i}{m_i - 1}}{1 + \sum_{i=1}^{K}\frac{1}{m_i - 1}}$$

[Equation 11]

3.4 Design of Transmission Symbol Pattern

Hereinafter, a method for designing a transmission pattern for symbols, that is, a method for designing a transmission precoding matrix will be described.

The transmission symbol pattern is determined in accordance with the design of the receiving mode switching pattern, which is described in 2.1 above. That is, based on the mode switching pattern described in 2.1, the AB is designed and a transmission precoder is determined.

Figure 12:
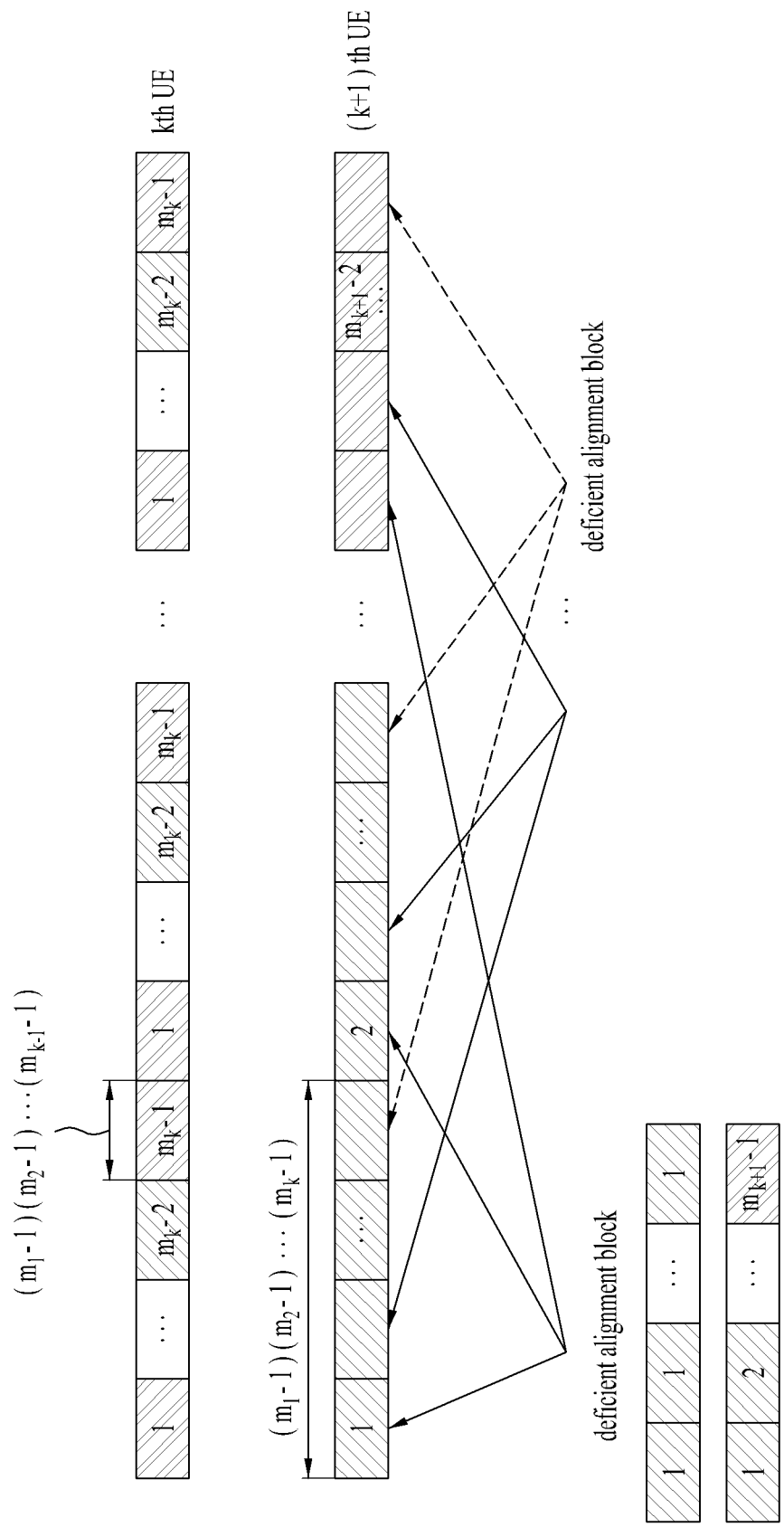
FIG. 12 is a diagram illustrating a method for configuring deficient ABs as an embodiment of the present invention.

FIG. 12 is a diagram illustrating a method for configuring deficient ABs as an embodiment of the present invention.

Referring to FIG. 12, a mode switching pattern of the k+1th user equipment and deficient alignment blocks (DAB) grouped by three arrows are noted. The DAB is configured from the first block described with reference to FIG. 11. At this time, the DAB is that the symbol transmission portion, which uses the last mode, is only excluded from the AB described in FIG. 11. The number of DABs of the k+1th user equipment is $(m_1-1)(m_2-1) \ldots (m_{k-1}-1)$, and the position of the symbols constituting each DAB may be obtained as expressed by the following Equation 12.

$$j, j + \prod_{i=1}^{k}(m_i - 1), j + 2 \times \prod_{i=1}^{k}(m_i - 1), \ldots ,$$

$$j + (m_{k+1} - 2) \times \prod_{i=1}^{k}(m_i - 1)$$

[Equation 12]

The DAB is configured as AB by being combined with a single symbol transmission period based on the last mode of the second block. When a transmission precoding matrix is configured, each AB corresponds to one block column in a precoding matrix. A matrix I is used at the position of the block row corresponding to the symbol transmission period of the AB.

For example, supposing that the second block is added behind the first block after the first block is designed, the number of block rows of the transmission precoding matrix is determined in accordance with the Equation 10 that expresses the entire symbol extension length. At this time, the matrix I is allocated to the position corresponding to the second block of the entire symbol extension length and the position of the corresponding block row in accordance with the value of the Equation 12. The position of each unit block constituting the AB may be varied depending on time. However, if the receiving mode switching pattern is designed differently, it is preferable that the transmission symbol pattern is designed to correspond to the receiving mode switching pattern.

3.5 2-User Equipment BC Case

Figure 13:
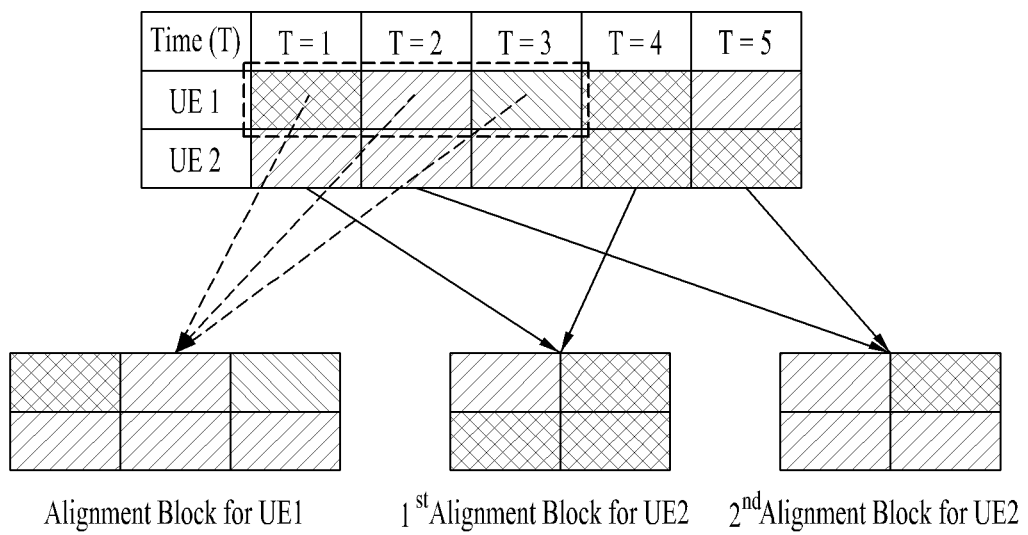
FIG. 13 is a diagram illustrating an example of a mode switching pattern of a receiver as an embodiment of the present invention.
Figure 14:
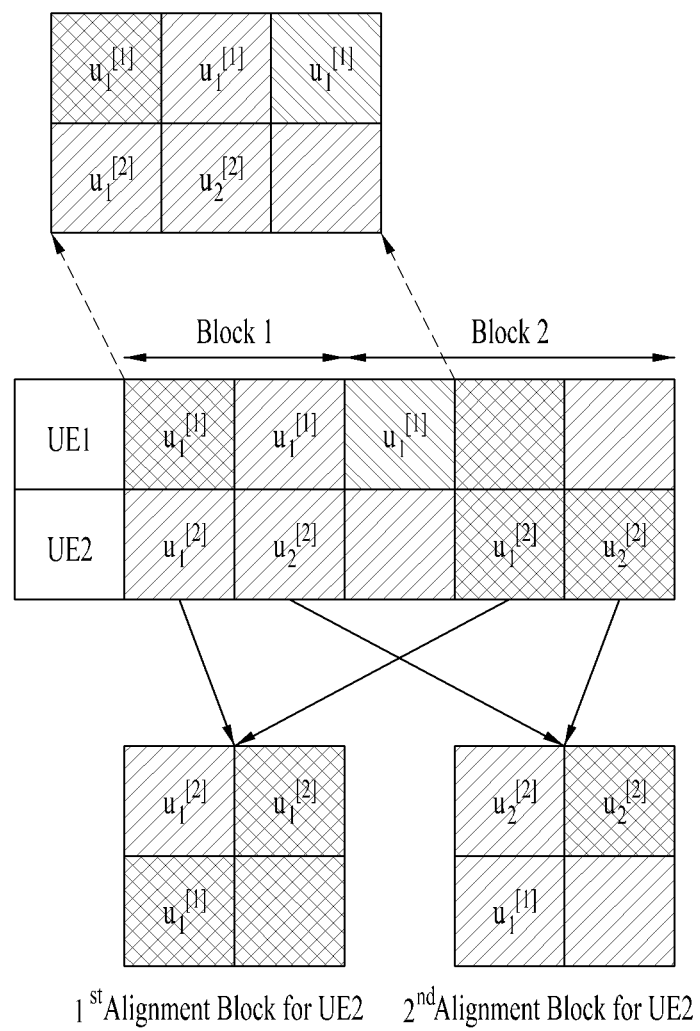
FIG. 14 is a diagram illustrating a method for dividing a mode switching pattern into a first block and a second block.

FIG. 13 is a diagram illustrating an example of a mode switching pattern of a receiver as an embodiment of the present invention, and FIG. 14 is a diagram illustrating a method for dividing a mode switching pattern into a first block and a second block.

In FIG. 13, it is assumed that the number of antennas of the first receiver UE1 is 3, the number of antennas of the second receiver UE2 is 2, and the two receivers have 2-user MISO-BC environment having a single RF chain. FIG. 13 illustrates AB configuration per user equipment according to the mode switching pattern.

Referring to FIG. 13, since one 3×1 symbol vector is transmitted to the UE1 that receives data using three modes, the transmitter generates one AB for symbol extension periods of a total of five times. In order to transmit two 2×1 symbol vectors to the UE2, the transmitter generates two ABs. The transmitter transmits one 2×1 symbol vector through each AB. As a result, the UE1 receives three data streams, and the UE2 receives four data streams.

At this time, in order to transmit more data (that is, symbol vectors) to the UE1, the symbol extension length should be increased in accordance with the number of symbol vectors, whereby ABs corresponding to the number of symbol vectors should be generated.

The transmission symbol pattern is determined by the receiving mode switching pattern and ABs. The transmitter repeatedly transmits 3×1 or 2×1 symbol vector for each receiver within each AB. Also, although the transmitter (or base station) transmits data for the UE2 from two ABs, each AB is designed not to overlap with another AB at the symbol transmission period and transmits a symbol vector different from that of another AB.

Referring to FIG. 14, since the first user equipment UE1 has three antennas, the AB for the UE1 includes three symbols, and since the second user equipment UE2 has two antennas, the AB for the UE2 includes two symbols. At this time, it is noted that each AB for each of the UE1 and the UE2 includes one symbol pattern that does not include an interference signal. FIG. 15 is a diagram illustrating an example of a transmission precoding matrix based on a switching pattern described in FIGS. 13 and 14 as an embodiment of the present invention.

The following Equation 13 represents a transmission message symbol.

$$X = \begin{bmatrix} I_{3\times3} & 0_{3\times3} \\ I_{3\times3} & 0_{3\times3} \\ I_{3\times3} & 0_{3\times3} \\ 0_{3\times3} & 0_{3\times3} \\ 0_{3\times3} & 0_{3\times3} \end{bmatrix} \begin{bmatrix} u_{11}^{[1]} \\ u_{12}^{[1]} \\ u_{13}^{[1]} \\ 0 \\ 0 \\ 0 \end{bmatrix} + \begin{bmatrix} I_{3\times3} & 0_{3\times3} \\ 0_{3\times3} & I_{3\times3} \\ 0_{3\times3} & 0_{3\times3} \\ I_{3\times3} & 0_{3\times3} \\ 0_{3\times3} & I_{3\times3} \end{bmatrix} \begin{bmatrix} u_{11}^{[2]} \\ u_{12}^{[2]} \\ 0 \\ u_{21}^{[2]} \\ u_{22}^{[2]} \\ 0 \end{bmatrix} \quad \text{[Equation 13]}$$

The number In the Equation 13, $u_{ij}^{[k]}$ means the jth data stream of the ith symbol vector for the receiver k. At this time, the ith symbol vector is transmitted through the ith AB.

Referring to FIGS. 13 to 15, the transmitter and/or the receiver uses five spatial resources through symbol extension of five times. At this time, the UE1 aligns four interference data streams through a 2-dimensional signal space (rank 2) and receives three desired data streams through the other 3-dimensional signal space (rank 3). At this time, the UE1 may control the interference signal by using the adaptive BIA scheme.

FIG. 16 is a diagram illustrating a method for controlling an interference signal by using an adaptive BIA scheme.

The UE2 aligns three interference data streams in 1-dimensional signal space (rank 1), and detects its desired data by using the other 4-dimensional signal space (rank 4). At this time, in FIGS. 13 to 16, since the transmitter generates one AB for the UE1, the transmitter transmits one 3×1 sized symbol vector. Also, since the UE2 receives one interference symbol vector only, the UE2 may align the interference signal in 1-dimensional signal space.

As described above, the transmitter repeatedly transmits one $M_k \times 1$ symbol vector per alignment block for the kth user equipment, and the kth user equipment receives a desired signal in a signal space of $M_k$ dimension through mode switching of data which are repeatedly transmitted.

On the other hand, the kth user equipment aligns one interference symbol vector in 1-dimensional signal space regardless of a size of the vector. Therefore, a signal space (rank) for aligning interference signals equivalent to the number of ABs (the number of symbol vectors transmitted to the other user equipments) designed for the other user equipments is required.

3.6 Normalization of User Equipment Case

Hereinafter, normalization of the number $M_1$ of RF chains and the number $M_2$ of receiving antennas of two user equipments will be described. That is, 2-user equipment BC case is considered, in which the number of switchable modes of the UE1 and the UE2 is $$m_1 = \left\lceil \frac{M_1}{L_1} \right\rceil, m_2 \left\lceil \frac{M_2}{L_2} \right\rceil, m_1 < m_2.$$

It is assumed that the UE2 of which switchable modes are more than those of another UE continues to perform mode switching. The transmitter may transmit the same vector symbol to the UE2 repeatedly $m_2$ times together with $m_2-1$ number of symbol vectors for the UE1 (that is, first block). Also, the transmitter transmits the symbol vectors to the UE1 repeatedly a total of $m_1$ times. At this time, each symbol vector should be transmitted without being mixed with other data at least once (that is, second block).

Figure 17:
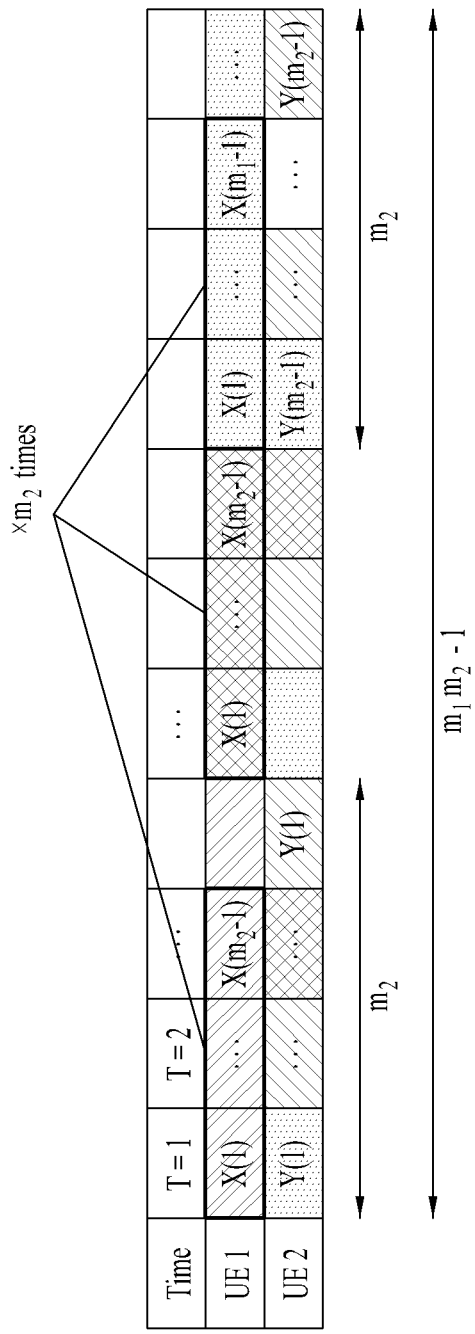
FIG. 17 is a diagram illustrating periods corresponding to a first block and a second block of a mode switching pattern and a minimum symbol extension length as an embodiment of the present invention.
Figure 18:
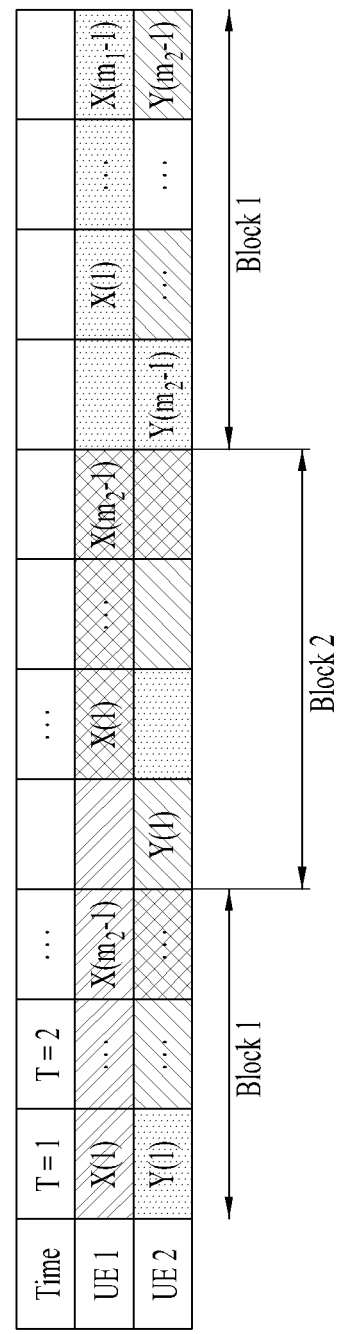
FIG. 18 is a diagram illustrating periods corresponding to a first block and a second block of a transmission symbol pattern and a necessary symbol extension length.

FIG. 17 is a diagram illustrating periods corresponding to a first block and a second block of a mode switching pattern and a minimum symbol extension length as an embodiment of the present invention, and FIG. 18 is a diagram illustrating periods corresponding to a first block and a second block of a transmission symbol pattern and a necessary symbol extension length. The symbol transmission length required in FIGS. 17 and 18 is as expressed by the following Equation 14.

$$(m_1-1)(m_2-1)+(m_1-1)+(m_2-1)=m_1 m_2 -1 \quad \text{[Equation 14]}$$

Also, degree of freedom (DoF), which may be acquired through a total number of data streams which are transmitted and the adaptive BIA scheme suggested in the present invention, may be calculated as expressed by the following Equation 15.

$$DoF = \frac{m_1(m_2-1)+m_2(m_1-1)}{m_1 m_2 -1} \quad \text{[Equation 15]}$$

4. Adaptive BIA Scheme of the Normalized Number of transmission Symbol Vectors

The embodiments of the present invention, which are described hereinafter, relate to an adaptive BIA scheme for performing minimum symbol extension only in accordance with the number $d_1, d_2, \ldots, d_k$ of symbol vectors transmitted to each receiver on the assumption that the number of selectable modes of all the receivers (or user equipments) is provided equally ($M_1=M_2= \ldots =M_k=M$, $L_1=L_2= \ldots =L_k=L$).

4.1 Design of Receiving Mode Switching Pattern and Transmission Symbol Pattern

To normalize the transmission symbol vectors, the receiving mode switching pattern and the transmission symbol pattern are designed in accordance with the following manners.

(1) When one receiver receives desired symbol vectors through mode switching, the other receives maintain a certain mode.

(2) The receiver having M number of modes and $d_k$ number of designed symbol vectors should receive each symbol vector repeatedly M times. At this time, the receiver does not receive the same symbol vectors in the same mode.

(3) When the transmitter transmits symbol vectors, the transmitter configures ABs so that all the symbol vectors are not transmitted together with the other symbols at least once or more. This is to remove interference signals and decode desired signals (that is, second block).

(4) The transmitter transmits the transmission symbols through overlap if possible, whereby a necessary symbol extension length is minimized and the number of symbols which are transmitted is maximized (that is, first block).

To normalize the transmission symbol vectors, data transmitted to a total K number of receivers are aligned in accordance with sizes of the symbol vectors, whereby UE1, UE2, . . . , UEk of $d_1 \geq d_2 \geq K \geq d_K$ are assumed. First of all, a necessary symbol extension length is obtained in accordance with the number of symbol vectors for a simple case where two receivers of $d_1 \geq d_2$ exist, and extension and normalization are performed for a case where three or more user equipments exist.

Figure 19:
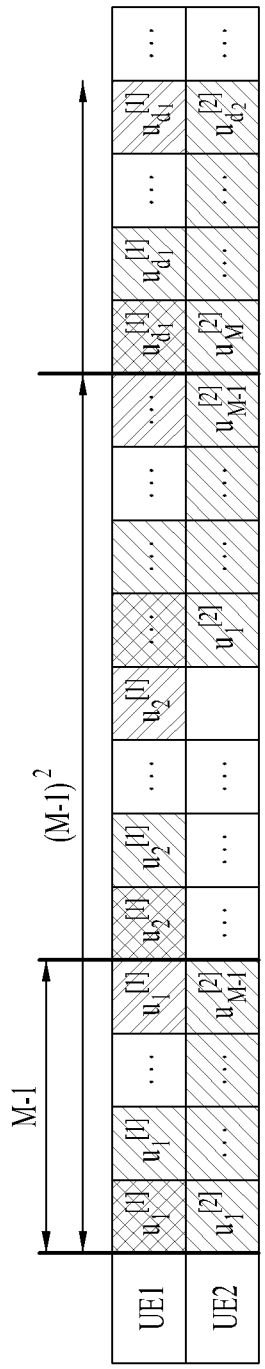
FIG. 19 is a diagram illustrating a structure of a first block configured in accordance with the number of symbol vectors transmitted to two user equipments as an embodiment of the present invention.

FIG. 19 is a diagram illustrating a structure of a first block configured in accordance with the number of symbol vectors transmitted to two user equipments as an embodiment of the present invention.

It is assumed that the UE1 performs mode switching for all symbol transmission periods. At this time, the UE1 receives the first symbol vector $u_1^{[1]}$ from a transmission period T=1 to T=M−1, and receives the second symbol vector $u_2^{[1]}$ from T=M to T=2M−2. Also, the UE1 receives $d_1$ number of symbol vectors in the same manner.

That is, mode switching of the UE1 is performed in such a manner that the same pattern is repeated at a period of M−1. To design AB, when the mode of the UE1 is switched, the mode of the UE2 should be maintained. Therefore, mode switching of the UE2 is performed in such a manner that the same pattern is repeated at a period of $(M-1)^2$. Based on this, the first block has regularity as shown in FIG. 20 in accordance with a value of $d_1$.

FIG. 20 is a diagram illustrating an example of a first block configured for two user equipments as an embodiment of the present invention.

Referring to FIG. 20, in case of a symbol vector $d_1$=1 which will be transmitted, the UE1 receives only the vector $u_1^{[1]}$ from the first block in different modes M−1 times. Since the UE1 performs mode switching per all symbol periods, the UE2 should maintain the same mode for a symbol transmission period of 1≤T≤M−1. Therefore, for this symbol transmission period, the transmitter may transmit the symbol vector $u_1^{[2]}$ for the UE2 through overlap of once, and transmits $u_1^{[2]}$ M−2 times from the time when transmission of the symbol vector $u_1^{[1]}$ ends.

Figure 21:
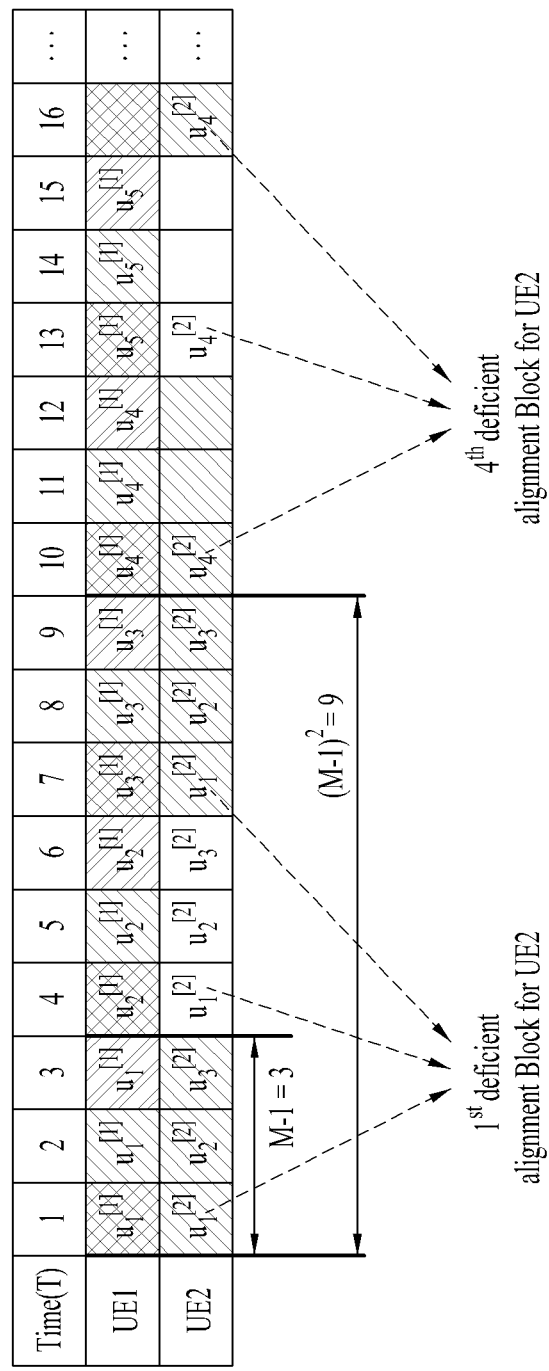
FIG. 21 is a diagram illustrating an extension symbol length generated to normalize a transmission symbol vector as an embodiment of the present invention.

In case of a symbol vector $d_1$=2 which will be transmitted, $u_1^{[1]}$ and $u_1^{[2]}$ are different symbol vectors transmitted to the UE1. Therefore, the two symbols should be transmitted through their respective ABs different from each other, which are designed not to be overlapped with each other. That is, in order that the UE1 generates different ABs to receive the symbol vectors $u_1^{[1]}$ and $u_1^{[2]}$, the mode used by the UE2 should be varied depending on each symbol (see FIG. 21). Referring to FIG. 21, which will be described hereinafter, it is noted that the symbol vector $u_1^{[2]}$ for the UE2 is transmitted by overlap of two times while the transmitter is transmitting the symbol vectors $u_1^{[1]}$ and $u_1^{[2]}$.

Through such regularity, in case of $d_1$=M−1, $d_1 \geq d_2$, it is noted that the symbol vector for the UE2 may be transmitted by overlap of M−1 times while the transmitter is transmitting the symbol vector for the UE1. That is, in case of $d_1$=M−1, $d_1 \geq d_2$, signals for the UE2 may be transmitted by overlap. If $d_1$=M, as shown in FIG. 19, it is noted that a mode switching period $(M-1)^2$ of the UE2 ends and the same pattern again starts. Also, the transmitter may transmit symbol vectors $u_1^{[2]}$, . . . , $u_{M-1}^{[2]}$, of the UE2 through overlap for a transmission period to reach $d_1$=M−1. Therefore, in case of d1≥d2 as described above, the transmitter may transmit symbol vectors to the UE2 through overlap if possible in accordance with the value of $d_1$ for a period of $1 \leq T \leq (M-1)^2$ and the number of transmission of the symbol vectors is equally applied to a period $(M-1)^2+1 \leq T \leq 2(M-1)^2$.

FIG. 21 is a diagram illustrating an extension symbol length generated to normalize a transmission symbol vector as an embodiment of the present invention.

In FIG. 21, it is assumed that an extension symbol length is generated in case of M−1=3 and $d_1$=5, $d_1$=4 ($d_1 \geq d_2$). The symbol transmission period 10≤T≤15 is to transmit the fourth and fifth symbol vectors among the symbol vectors transmitted to the UE1. In FIG. 21, it is noted that the symbols transmitted to the UE2 may be overlapped with one another in case of $d_1$=M−1, $d_2 \leq 3$.

If $d_1$=4, the symbol vector $u_4^{[2]}$ may be transmitted to the UE2 through overlap once. In FIG. 21, in case of $d_1$=5 ($d_1 \geq M-1$), the base station may transmit the symbol vector $u_4^{[2]}$ for the UE1 repeatedly two times.

The UE2 represents the same mode switching pattern per period of $(M-1)^2$. For the repetition period of the same pattern, the transmitter may transmit the symbol vectors, which are not transmitted to the UE2 by overlap for a previous symbol transmission period, to the UE2 through overlap of ($d_1$, mod(M−1)) times while transmitting the symbol vector to the UE1. Since the transmitter and/or the user equipment has only to consider the symbol transmission period of a length of $(M-1)^2$, among desired symbol vectors of the UE2, ($d_2$, mod(M−1)) number of symbol vectors included in the corresponding transmission period are not overlapped for the transmission time of the UE1. Each symbol vector should be transmitted from the first block repeatedly M−1 times. Therefore, the number of transmission times of the respective symbol vectors, which should be transmitted additionally except the number of symbol vectors already included in the corresponding transmission period, may be expressed by the following Equation 16.

$$d_1 \neq n(M-1),$$ [Equation 16]

$$\begin{cases} \text{if } n(M-1)+1 \leq d_1, d_2 \leq (n+1)(M-1) \rightarrow \\ \quad M-1-(d_1, \text{mod}(M-1)) \\ \text{otherwise} \rightarrow 0 \end{cases}$$

$$d_1 = n(M-1) \rightarrow 0,$$

where n=0, 1, 2, 3, . . . .

Based on the Equation 16, the length of the first block for the UE2 in case of 2-user equipment BC system may be expressed by the following Equations 17 and 18.

$$l_{Block1}^{[2]}=(M-1)d_1, \text{ if } d_1=n(M-1), n=0,1,2,3,$$ [Equation 17]

$$l_{Block1}^{[2]}=(M-1)d_1+[M-1-(d_1,\text{mod}(M-1))](d_2,\text{mod}(M-1))$$ [Equation 18]

, if $d_1 \neq n(M-1)$, n(M−1)+1≤$d_1,d_2$≤(n+1)(M−1), n=0, 1, 2, 3, . . . ,

In the Equations 17 and $l_{Block1}^{[2]}$ means the length of the first block.

Hereinafter, a 3-user equipment BC system will be described.

Figure 22:
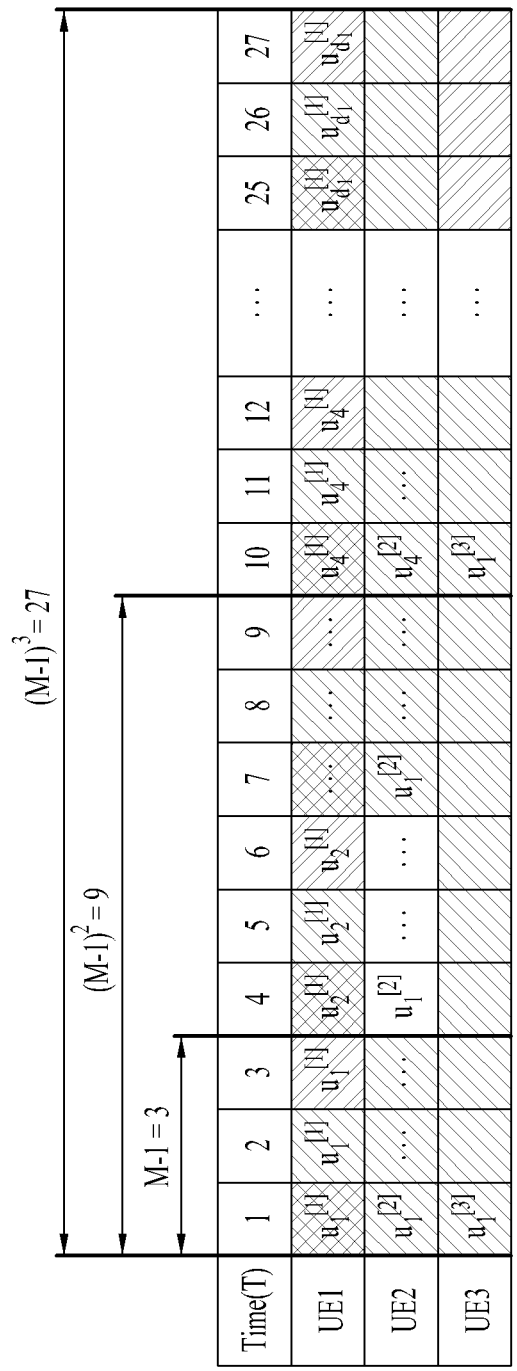
FIG. 22 is a diagram illustrating an extension symbol length used in a three-user equipment BC system as an embodiment of the present invention.

The case of M−1=3 will be considered to find regularity for the symbol extension length required depending on the number of symbol vectors. The first block has a structure as shown in FIG. 22. FIG. 22 is a diagram illustrating an extension symbol length used in a 3-user equipment BC system as an embodiment of the present invention.

In this case, a mode of a UE3 should be maintained uniformly for a period $1 \leq T \leq (M-1)^2$ for transmitting vectors $u_1^{[1]}, \ldots, u_{M-1}^{[1]}$ to the UE1. Therefore, the transmitter may transmit symbol vectors of the UE3 through overlap of once with the symbol vectors for another user equipment. However, considering a period $1 \leq T \leq (M-1)^2$ for transmitting vectors $u_1^{[1]}, \ldots, u_{2M-1}^{[1]}$ to the UE1, the transmitter may transmit the symbol vectors of the UE3 through overlap of two times. Therefore, regularity as expressed by the following Equation 19 may be found in accordance with the value of $d_1$.

$$r = (M-1)d_1 \backslash (M-1)^2, \qquad \text{[Equation 19]}$$

if x\y: quotient of x÷y

The Equation 19 means that the symbol vectors for the UE3 may be transmitted by overlap of r+1 times while the transmitter is transmitting $d_1$ number of symbol vectors for the UE1. However, since the symbol vectors transmitted to the UE2 cannot be transmitted by overlap for the period for transmitting data to the UE1, the case as shown in FIG. 20 occurs.

In this way, since the UE3 should maintain the same mode even for the period for additionally transmitting symbols of the UE2, the transmitter cannot transmit the symbol vectors to the UE3 through overlap. Therefore, in the 3-user equipment case, it is preferable that a minimum symbol extension length is determined in the first block based on the UE1. At this time, the length of the first block may be required as expressed by the following Equation 20.

$$l_{Block1}^{[3]} = l_{Block1}^{[2]} + [(M-2) - [(M-1)d_1 \backslash (M-1)^2]]^+ \times (d_3, \bmod(M-1)^2) \qquad \text{[Equation 20]}$$

In the Equation 20, $[\alpha]^+$ means $\alpha \geq 0 \rightarrow [\alpha]^+ = \alpha$, $\alpha < 0 \rightarrow [\alpha]^+ = 0$.

The same principle as that of the 3-user equipment BC case may be applied to 4-user equipment or more in accordance with a period of a mode switching pattern of the user equipment. Therefore, the following Equations 21 and 22 may be obtained.

$$l_{Block1}^{[4]} = l_{Block1}^{[3]} + \left[(M-2) - [(M-1)d_1\backslash(M-1)^3]\right]^+ \times \quad \text{[Equation 21]}$$
$$(d_4, \bmod(M-1)^3)$$

$$l_{Block1}^{[5]} = l_{Block1}^{[4]} + \left[(M-2) - [(M-1)d_1\backslash(M-1)^4]\right]^+ \times$$
$$(d_5, \bmod(M-1)^4)$$

$$l_{Block1}^{[K]} = l_{Block1}^{[K-1]} + \left[(M-2) - [(M-1)d_1\backslash(M-1)^{K-1}]\right]^+ \times \quad \text{[Equation 22]}$$
$$(d_K, \bmod(M-1)^{K-1})$$

$$l_{Sybext}^{[K]} = l_{Block1}^{[K]} + l_{Block2}^{[K]} = l_{Block1}^{[K]} + \sum_{k=1}^{K} d_k$$

The Equation 21 is to obtain the length of the first block in case of 4-user equipment and 5-user equipment BC cases, and the Equation 22 is to obtain the length of the first block in the case that the Equation 21 is extended to K-user equipment BC case.

Degree of freedom (DOF) that may be achieved using the above Equations 16 to 22 may be expressed by the following Equation 23.

$$DoF^{[K]} = \frac{\sum_{k=1}^{K} d_k M}{l_{symext}^{[K]}} = \frac{\sum_{k=1}^{K} d_k M}{l_{Block1}^{[K]} + l_{Block2}^{[K]}} = \qquad \text{[Equation 23]}$$

$$\frac{\sum_{k=1}^{K} d_k M}{l_{Block1}^{[K-1]} + \left[(M-2) - \left((M-1)d_1\backslash(M-1)^{K-1}\right)\right]^+ \cdot}$$
$$(d_K, \bmod((M-1)^{K-1})) + \sum_{k=1}^{K} d_k$$

In short, (1) it is assumed that the base station aligns the symbol vectors, which will be transmitted K number of user equipments, in accordance with sizes and that UEs are referred to as UE1, UE2, UEK in the descending order of the UEs having the more number of symbol vectors. In addition, it is assumed that the UE1 changes the modes at the every symbol transmission time.

(2) The base station identifies, from the above Equations 16 to 18, how many symbol vectors transmitted to the UE2 are not overlapped for the period for transmitting the symbols of the UE1, and determines the mode switching pattern of the UE2 from the first block.

(3) The base station identifies, based on the above Equations 20 to 22, symbol vectors which are transmitted by the third to Kth user equipments without overlap for the symbol transmission period for the UE1, and determines the mode switching pattern of the UE1.

(4) If the mode switching pattern is determined, the base station determines the adaptive BIA and the transmission precoding matrix in accordance with the method described in section 3.

Hereinafter, the aforementioned description will be described in more detail.

4.2 Application Example of 3-User Equipment BC Case

Hereinafter, it is assumed that three user equipments receive symbol vectors through three different modes ($M_1 = M_2 = M = 3$, $L_1 = L_2 = L = 1$, $d_1 = 3$, $d_2 = 2$, $d_3 = 1$).

It is assumed that the number of the transmitter transmits three desired symbol vectors to the UE1, transmits three desired symbol vectors to the UE2 and transmits one desired symbol vector to the UE3. First of all, it is assumed that the UE1 having the largest number of received symbol vectors performs mode switching per symbol reception time, and the base station determines a mode switching pattern of $(M_1 - 1)d_1 = 6$ times required for the first block, as shown in FIG. 23. FIG. 23 is a diagram illustrating a structure of a first block configured for an adaptive BIA scheme applied to three user equipments as an embodiment of the present invention.

Referring to FIG. 23, since $d_1 = M_1 - 1$, the base station may overlap symbol transmission for the UE2 with the signals of the UE1 within the first block in accordance with the Equation 16. Also, the base station configures the mode switching pattern of the UE2 to be repeated at a period of $(M-1)^2$. The base station may transmit the symbol vectors for transmission to the UE3 for the symbol transmission period for the UE1 and the UE2 through overlap of two times by using the Equation 19. Therefore, the mode switching pattern of the UE3 is configured at a period of $(M-1)^3$.

However, referring to the Equation 20, since the length of the first block is 6, the UE3 does not need mode switching as much as a period of once in case of $(M-1)^3=8$. Therefore, the UE3 performs mode switching at T=5, maintains the same receiving mode to reach T=6 so as to satisfy a condition of a third deficient alignment block (DAB) for the UE1.

As a result, the number of DABs for the UE1 is 3, and if the DABs for the UE1 are represented by a symbol transmission time $(T_1, T_2)$, the DABs include mode switching patterns of (1, 2), (3, 4) and (5, 6). The number of DABs for the UE2 is 2, and the DABs for the UE2 include mode switching patterns of (1, 3) and (2, 4). The number of DABs for the UE3 is 1, and the DAB for the UE3 includes a mode switching pattern of (1, 5).

Figure 24:
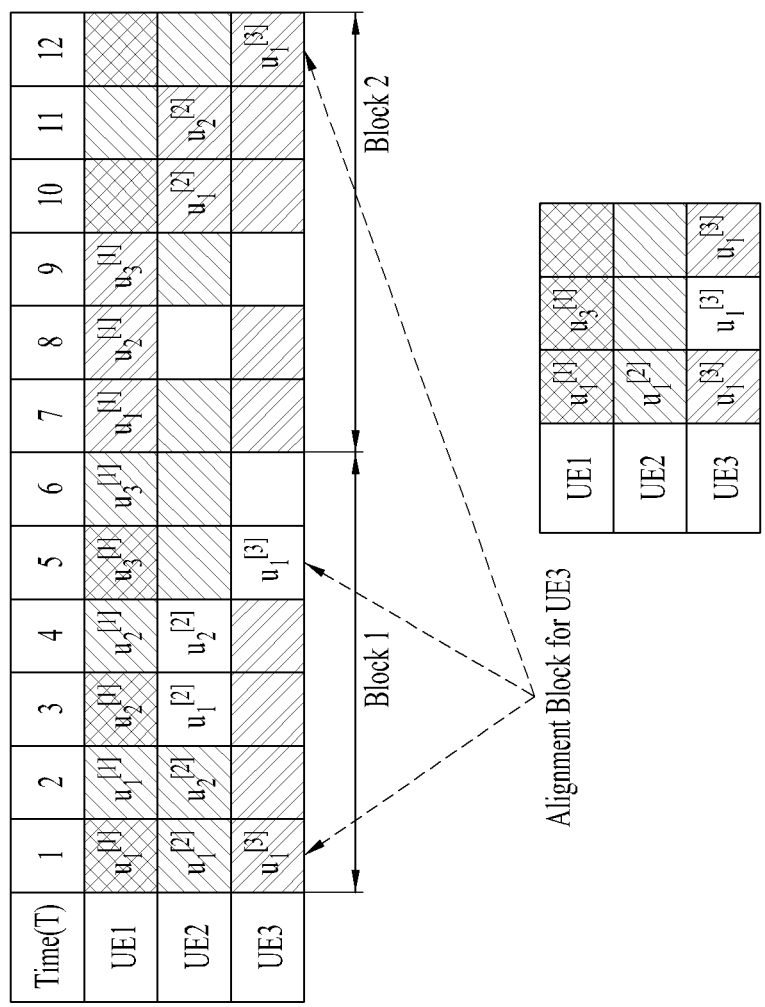
FIG. 24 is a diagram illustrating an example of a mode switching pattern to which an adaptive BIA scheme is applied, as an embodiment of the present invention.

The base station may complete mode switching patterns as shown in FIG. 24 by adding the other one transmission symbol vector from the second block to the DAB configured from the first block shown in FIG. 23.

FIG. 24 is a diagram illustrating an example of a mode switching pattern to which an adaptive BIA scheme is applied, as an embodiment of the present invention.

Each user equipment should receive the symbol vectors, which are received from the first block, once more by using the last mode which is not used. However, as described above, since the symbols of the second block become the last symbols of each AB, the modes of the UE2 and the UE3 at a time T=1, 2 when $u_1^{[1]}$ is transmitted should be the same as the modes of the UE2 and the UE3 at T=8 corresponding to the second block. The same rule is applied to even the pattern of the other symbol vectors. The transmission symbol pattern corresponding to the mode switching pattern is also shown in FIG. 24.

Referring to the alignment block (AB) for the UE3 in FIG. 24, the symbols for the UE1 are not transmitted once, and the symbols for the UE2 are not transmitted two times. That is, resources that may additionally transmit the symbol vectors once more remain in the UE2. However, although the symbol vectors may be transmitted by overlap for the corresponding period, additional transmission of $M_2-1$ times is finally required, whereby the symbol extension length becomes longer.

As described above, in the present invention, since the symbol vectors may be transmitted to each user by minimum symbol extension, the symbol extension length and DoF may be determined variably in accordance with the length assured as a certain value by the channel of the user equipment.

5. Adaptive BIA Scheme of the Normalized Number of Transmission Symbol Vectors and the Normalized Number of Receiving Modes The case where the number of transmission symbol vectors is normalized has been described section 4. Hereinafter, the adaptive BIA scheme corresponding to the case where the number of receiving modes as well as the number of transmission symbol vectors is also normalized will be described.

5.1 Design of Receiving Mode Switching Pattern and Transmission Symbol Pattern

The receiving mode switching pattern and the transmission symbol pattern are configured through design rules and principles as follows.

(1) When a target receiver receives data through mode switching, the other receivers maintain a certain mode.

(2) The receiver having $m_k$ number of modes and $d_k$ number of desired symbol vectors should receive each symbol vector repeatedly $m_k$ times. At this time, the receiver does not receive the same symbol vector in the same mode.

(3) When the transmitter transmits symbol vectors, all the symbol vectors are configured not to be transmitted together with the other symbols at least once or more. This is assured automatically from design of the second block.

(4) The transmitter transmits the transmission symbols through overlap if possible, whereby a symbol extension length which is required is minimized.

5.2 Adaptive BIA Based on the Normalized Number of Transmission Symbol Vectors and the Number of Receiving Modes It is assumed that K number of user equipments receive data by using $L_k$ number of RF chains, $M_k$ number of receiving antennas and $$m_k = \left\lceil \frac{M_k}{L_k} \right\rceil$$

number of receiving modes. However, the number $M_T$ of antennas of the transmitter should satisfy $$M_T \geq \max_{\forall k}\{M_k\}.$$

Figure 25:
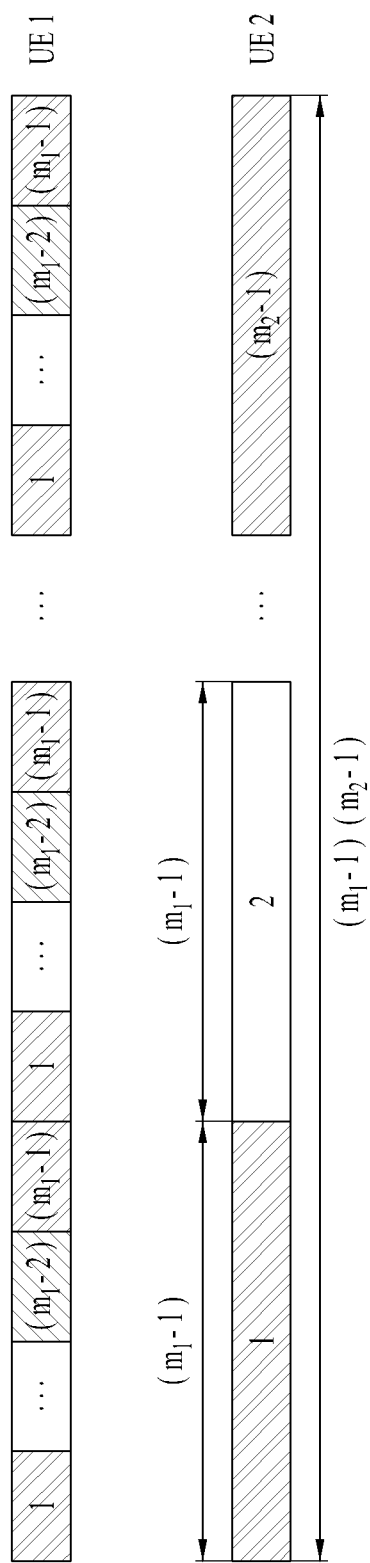
FIG. 25 is a diagram illustrating an extension symbol length of a two-user equipment BC case as an embodiment of the present invention.

First of all, referring to an extension symbol length of 2-user equipment BC case shown in FIG. 25, the length of the first block is $(m_1-1)(m_2-1)$. When the first block is designed by extension to K user equipment BC case, mode switching patterns of the UE1 and the UE2 are generated repeatedly at a period of $(m_1-1)(m_2-1)$.

Therefore, the mode switching patterns of the UE1 and the UE2 have the same receiving mode patterns at a symbol transmission period $n(m_1-1)(m_2-1)+1 \leq T \leq (n+1)(m_1-1)(m_2-1)$. In the 2-user equipment BC case, a total number of symbol vectors that may be transmitted from the first block of a length of $(m_1-1)(m_2-1)$ to the UE1 and the UE2 is $d_1=m_2-1$ and $d_2=m_1-1$, respectively. To describe this, the receiving mode switching pattern of the user equipment at a symbol transmission period $1 \leq T \leq (m_1-1)(m_2-1)$ and the transmission symbol pattern based on the time of the transmitter will be described with reference to FIG. 26.

Figure 26:
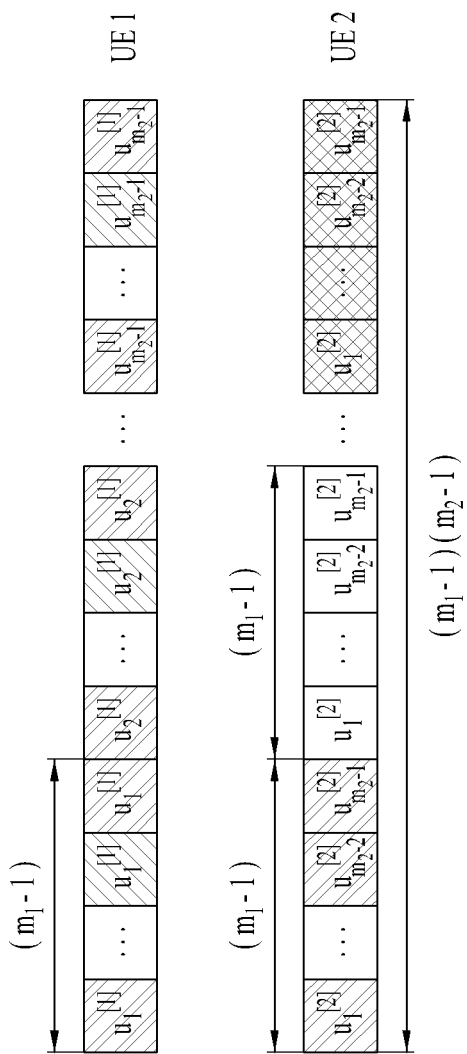
FIG. 26 is a diagram illustrating that a transmission vector is marked in an extension symbol length of FIG. 25 as an embodiment of the present invention.
Figure 27:
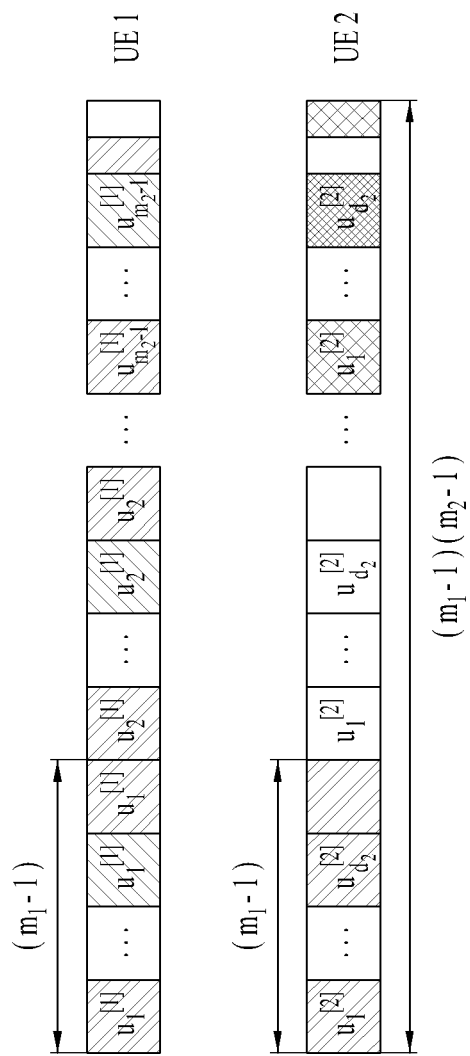
FIG. 27 is a diagram illustrating that an embodiment of FIG. 26 is normalized as an embodiment of the present invention.

FIG. 26 is a diagram illustrating that a transmission vector is marked in an extension symbol length of FIG. 25 as an embodiment of the present invention, and FIG. 27 is a diagram illustrating that an embodiment of FIG. 26 is normalized.

Referring to FIG. 26, even though the number of users is increased or the number of symbol vectors which are transmitted is increased, the same pattern is repeated at a period of $(m_1-1)(m_2-1)$. Therefore, the base station may find regularity of mode switching patterns generated in accordance with values of $d_1$, $d_2$, $m_1$ and $m_2$ for the period of $1 \leq T \leq (m_1-1)(m_2-1)$ and a symbol extension length required for the first block, and may normalize the length of the first block required for 2-user equipment BC based on the found regularity. At this time, supposing $d_1 \geq d_2$, in the 2-user equipment BC case, the following regularity may be found for the period of $1 \leq T \leq (m_1-1)(m_2-1)$.

If $d_1=1, 2, \ldots, m_2-1$, the base station may transmit the symbol vectors to the UE2 through overlap of $1, 2, \ldots, m_2-1$ times. For example, if the number of symbol vectors transmitted to the UE1 is 2, it corresponds to a period of $1 \leq T \leq 2 (m_1-1)$ in FIG. 27, and the base station may transmit the symbol vectors to the UE2 through overlap of two times for the period. If the number of symbol vectors transmitted to the UE2 is greater than $m_1-1$, the symbol vectors which are not transmitted for the period of $1 \leq T \leq 2$ ($m_1-1$) may occur. However, since the same pattern is repeated, the symbol vectors transmitted to the UE2 may be considered at next period. As a result, for the symbol transmission period of $1 \leq T \leq (m_1-1)(m_2-1)$, the base station may transmit the symbols to the UE2 through overlap of ($d_1$, mod($m_2-1$)) times while transmitting data to the UE1.

At this time, the symbol transmission period where the same mode switching pattern is repeated is $n(m_1-1)(m_2-1)+1 \leq T \leq (n+1)(m_1-1)(m_2-1)$, $n=0, 1, 2, 3 \ldots$. The length of the first block required to transmit data to the UE1 is $(m_1-1)d_1$. The base station may calculate a portion of data which are not transmitted to the UE2 through overlap, for the period of $(m_1-1)d_1$. At this time, the number of transmission times of data that should additionally be transmitted to the UE2 may be calculated as expressed by the following Equation 24.

$$m_2-1-(d_1, \mathrm{mod}(m_2-1)) \quad \text{[Equation 24]}$$

As the symbol vectors are not transmitted to the UE2 for the transmission period of $n(m_1-1)(m_2-1)+1 \leq T \leq (n+1)(m_1-1)(m_2-1)$, $n=0, 1, 2, 3 \ldots$, the number of symbol vectors that should be transmitted additionally may be calculated as expressed by the following Equation 25.

$$(d_2, \mathrm{mod}(m_2-1)) \quad \text{[Equation 25]}$$

In the aforementioned 2-user equipment BC case, the length of the first block may be expressed by the following Equation 26.

$$l_{Block1}^{[2]} = (m_1-1)d_1 + [m_2-1-(d_1,\mathrm{mod}(m_2-1))]^+ \cdot (d_2, \mathrm{mod}(m_2-1)) \quad \text{[Equation 26]}$$

Next, the 3-user equipment BC case will be described.

Figure 28:
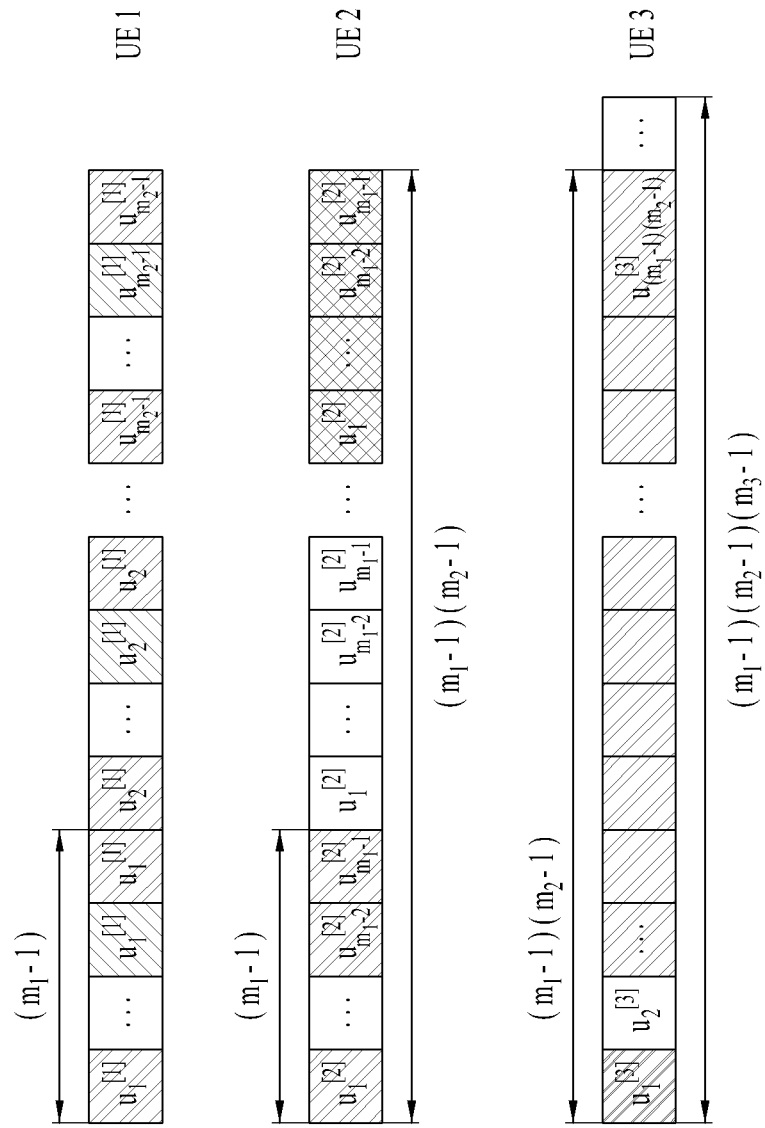
FIG. 28 is a diagram illustrating a method for obtaining a length of a first block in a three-user equipment BC case as an embodiment of the present invention.

FIG. 28 is a diagram illustrating a method for obtaining a length of a first block in a 3-user equipment BC case as an embodiment of the present invention.

As described with reference to FIGS. 25 to 27, it is important to find regularity of the symbol extension length required in accordance with the number of symbol vectors. At this time, it is preferable that the mode of the UE3 is maintained uniformly for the period of $1 \leq T \leq (m_1-1)(m_2-1)$ for transmitting $u_1^{[1]}, \ldots, u_{m_2-1}^{[1]}$. Therefore, the transmitter may transmit the symbol vectors for the UE3 and the symbol vectors for the UE1 through overlap of once. However, considering a period of $1 \leq T \leq (m_1-1)(m_2-1)(m_3-1)$ for transmitting $u_1^{[1]}, \ldots, u_{(m_2-1)(m_2-1)}$, the transmitter may transmit the symbol vectors of the UE3 through overlap of two times. Based on this, regularity as expressed by the following Equation 27 may be found depending on the value of d1.

$$r=(m_1-1)d_1 \backslash (m_1-1)(m_2-1) \quad \text{[Equation 27]}$$

, where x\y: quotient of x÷y

At this time, the transmitter may transmit the symbol vectors for the UE3 repeatedly r+1 times for the period for transmitting $d_1$ number of symbol vectors for the UE1, and the number of symbol vectors of the UE3, which should be transmitted additionally, is calculated as ($d_3$, mod(($m_1-1$)($m_2-1$))). Considering this, the transmitter may calculate the length of the first block as expressed by the following Equation 28 in case of 3-user equipment BC case.

$$l_{Block1}^{[3]} = l_{Block1}^{[2]} + [(m_3-2)-((m_1-1)d_1\backslash(m_1-1)(m_2-1))]^+ \cdot (d_3, \mathrm{mod}((m_1-1)(m_2-1))) \quad \text{[Equation 28]}$$

Considering the above regularity, in case of K-user equipment BC case, the Equations 26 and 28 may be normalized as expressed by the following Equation 29.

$$l_{Block\,1}^{[K]} = l_{Block\,1}^{[K-1]} + \left[(m_K-2)-\left((m_1-1)d_1\backslash\prod_{j=1}^{K-1}(m_j-1)\right)\right]^+ \cdot \left(d_K, \mathrm{mod}\left(\prod_{j=1}^{K-1}(m_j-1)\right)\right) \quad \text{[Equation 29]}$$

Therefore, the symbol extension length required for the K user equipment BC case considering the length of the second block and DoF to be achieved may be expressed by the following Equations 30 and 31.

$$l_{symext}^{[K]} = l_{Block\,1}^{[K]} + l_{Block\,2}^{[K]} = l_{Block\,1}^{[K]} + \sum_{k=1}^{K} d_k \quad \text{[Equation 30]}$$

$$DoF^{[K]} = \frac{\sum_{k=1}^{K} d_k M_k}{L_{symext}^{[K]}} = \frac{\sum_{k=1}^{K} d_k M_k}{l_{Block\,1}^{[K]} + l_{Block\,2}^{[K]}} = $$

$$\frac{\sum_{k=1}^{K} d_k M_k}{l_{Block\,1}^{[K-1]} + \left[(m_K-2)-\left((m_1-1)d_1\backslash\prod_{j=1}^{K-1}(m_j-1)\right)\right]^+ \cdot \left(d_K, \mathrm{mod}\left(\prod_{j=1}^{K-1}(m_j-1)\right)\right) + \sum_{k=1}^{K} d_k} \quad \text{[Equation 31]}$$

6. Adaptive BIA Scheme for K User Equipment Interference Channel

Hereinafter, a method for extending and applying the BIA scheme suggested in the sections 1 to 5 to a scheme for controlling interference in K-user IFC (InterFerence Channel) where a plurality of transmitters and a plurality of receivers exist in pairs will be described.

Figure 29:
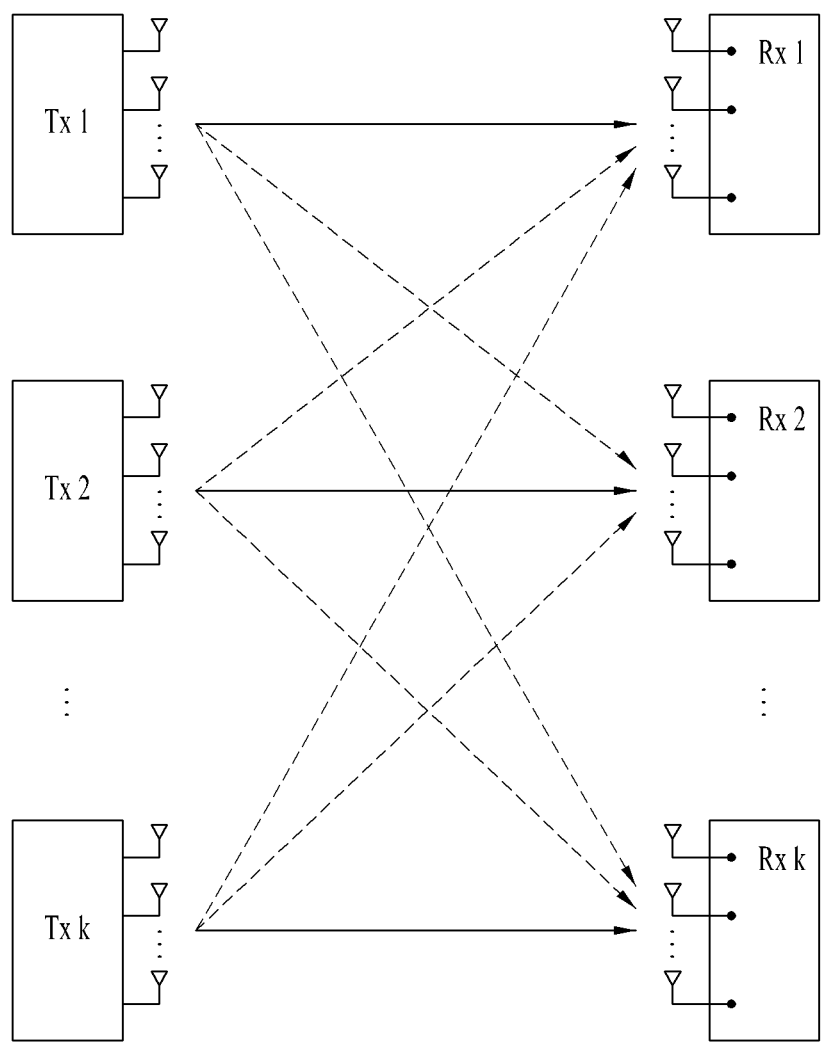
FIG. 29 is a diagram illustrating an example of K-user equipment IFC system model as an embodiment of the present invention.

FIG. 29 is a diagram illustrating an example of K-user equipment IFC system model as an embodiment of the present invention.

Prior to description of FIG. 29, 2-user equipment IFC system mode which is the simplest will be described. FIG. 30 is a diagram illustrating that a transmitting signal is transmitted and received in a 2-user equipment IFC and 2-user equipment BC case. In this case, dotted lines represent interference signals, and solid lines represent desired signals. Also, FIG. 31 is a diagram illustrating that received signals are represented by combination of desired signals of UE1 and UE2.

2-user equipment BC case of which single base station and two receivers are $M_1=3$, $L_1=1$, $M_2=2$, $L_2=1$ and 2-user equipment IFC where two transmitters and two receivers exist in pairs will be considered. This case will be considered with reference to the system model described in FIG. 22. Also, the equations expressing the transmission symbols of the transmitter in the 2-user equipment BC case, the mode switching patterns, and the methods for designing a transmission precoding matrix have been described in the section 3.

As will be aware of it from the Equation 12, two symbol patterns are provided to transmit data from one transmitter to a reception antenna 1 Rx1 and a reception antenna 2 Rx2.

In the 2-user equipment IFC, the signal for the UE1 is transmitted from the transmitter 1, and the signal for the UE2 is transmitted from the transmitter 2. At this time, receiving signals of the reception antenna Rx1 may be represented as shown in FIG. 31 in case of 2-user equipment BC and 2-user equipment IFC.

FIG. 31 is a diagram illustrating receiving signals of Rx1 in case of 2-user equipment BC and 2-user equipment IFC as an embodiment of the present invention.

Referring to FIG. 31, since interference channels $h_{12}^{[1]}(1), h_{12}^{[1]}(2)$ may be represented in case of 2-user equipment IFC, the receiving symbol vectors cannot be expressed by one channel vector unlike 2-user equipment BC case. However, in case of both the 2-user equipment IFC and the 2-user equipment BC case, it is noted that desired signals are received by a 3-dimensional signal space, and four interference data streams are aligned 2-dimensionally.

Referring to FIG. 29 again, the principles described in FIGS. 30 and 31 are also applied to the K-user equipment IFC. In the K-user equipment BC case, one transmitter transmits signals to K number of user equipments through overlap. However, in the K-user equipment IFC, K number of different transmitters transmit signals to the K number of user equipments. Also, if a structure of AB is maintained, the order of the reception mode switching pattern and the transmission symbol pattern may be varied depending on time.

7. Device for Implementation

Figure 32:
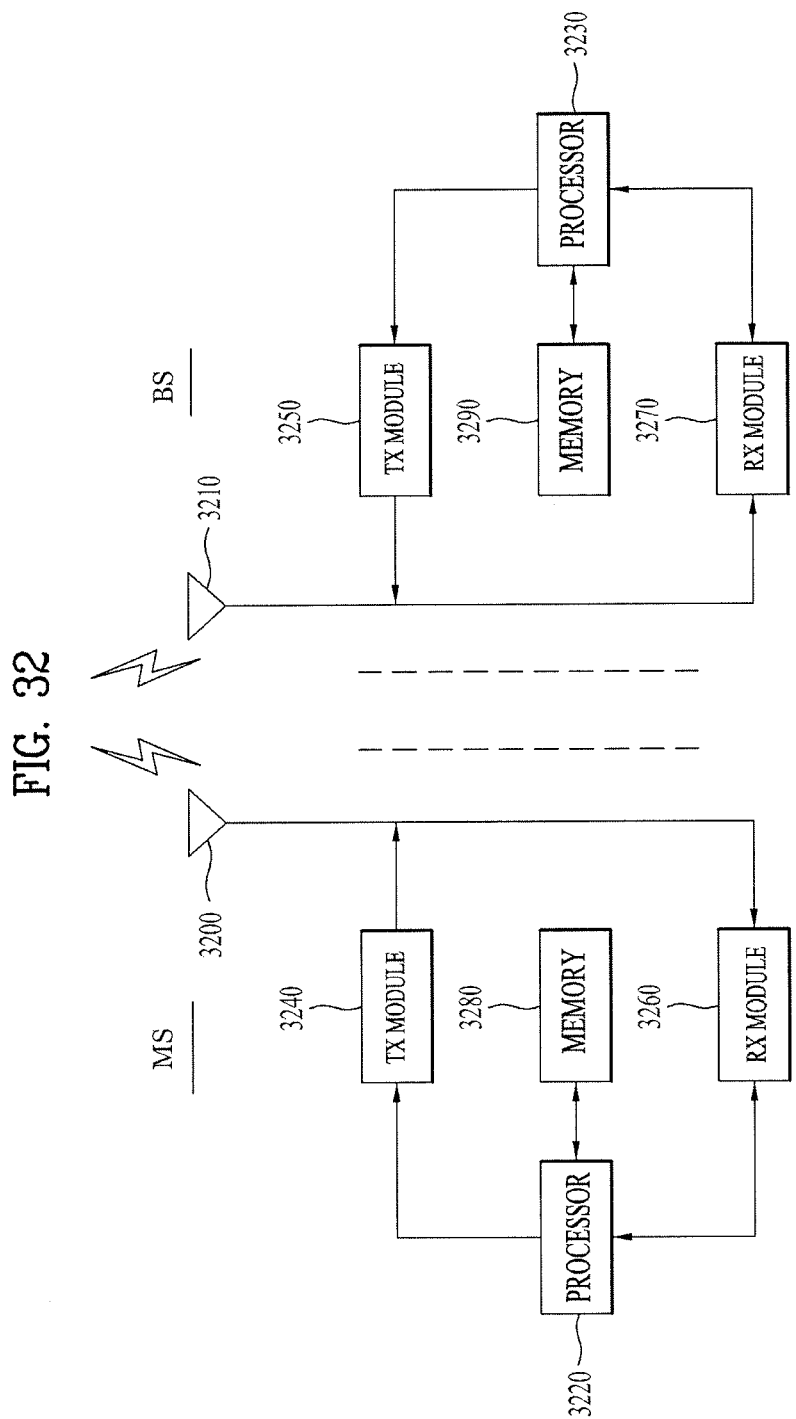
FIG. 32 is a diagram illustrating an example of a device through which embodiments described in FIGS. 1 to 31 are implemented.

A device described in FIG. 32 is a means through which the methods described in FIGS. 1 to 31 may be implemented.

The user equipment (UE) may be operated as a transmitter on an uplink and as a receiver on a downlink. Also, the base station (eNB: e-Node) may be operated as a receiver on the uplink and as a transmitter on the downlink.

In other words, each of the user equipment and the base station may include a transmission (Tx) module 3240, 3250 and a reception (Rx) module 3260, 3270 to control transmission and reception of information, data and/or message, and an antenna 3200, 3210 for transmitting and receiving information, data and/or message.

Also, each of the user equipment and the base station may include a processor 3220, 3230 for performing the aforementioned embodiments of the present invention and a memory 3290, 3290 for temporarily or continuously storing a processing procedure of the processor.

The embodiments of the present invention may be performed using elements and functions of the aforementioned user equipment and the aforementioned base station. For example, the processor of the base station may design first and second blocks for adaptive BIA by combination the methods disclosed in the aforementioned sections 1 to 6, and may configure AB, which will be transmitted to each user equipment, from the first and second blocks. Also, the user equipment may remove interference based on the AB received from the base station.

The transmission module and the reception module included in the user equipment and the base station may perform a packet modulation and demodulation function for data transmission, a quick packet channel coding function, an orthogonal frequency division multiple access (OFDMA) packet scheduling, time division duplex (TDD) packet scheduling and/or channel multiplexing function. Also, the user equipment and the base station of FIG. 32 may further include a low power radio frequency (RF)/intermediate frequency (IF) module. In this case, the transmission module and the reception module may be referred to as a transmitter and a receiver, respectively, and may be referred to as a transceiver if they are used together.

Meanwhile, in the present invention, as a user equipment, a personal digital assistant (PDA), a cellular phone, a personal communication service (PCS) phone, a global system for mobile (GSM) phone, a wideband CDMA (WCDMA) phone, a mobile broadband system (MBS) phone, a handheld personal computer (PC), a laptop, a smart phone or a multi mode-multi band (MM-MB) terminal may be used.

The smart phone refers to a terminal which has merits of a mobile communication terminal and a PDA and includes a data communication function of the PDA, such as scheduling, fax transmission/reception and Internet access, as well as the functions of the mobile communication terminal. In addition, the MM-MB terminal refers to a terminal which may include a multi-modem chip and operate in a portable Internet system and other mobile communication systems (e.g., a Code Division Multiple Access (CDMA) 2000 system, a Wideband CDMA (WCDMA) system, etc.).

The embodiments according to the present invention may be implemented by various means, for example, hardware, firmware, software, or their combination.

If the embodiments according to the present invention are implemented by hardware, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiments according to the present invention are implemented by firmware or software, the embodiment of the present invention may be implemented by a type of a module, a procedure, or a function, which performs functions or operations described as above. For example, a software code may be stored in a memory unit 3280 or 3290 and then may be driven by a processor 3220 or 3230. The memory unit may be located inside or outside the processor to transmit and receive data to and from the processor through various means which are well known.

It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The embodiments of the present invention may be applied to various access systems.

The invention claimed is:

1. A method for transmitting a signal in accordance with an adaptive blind interference alignment (BIA) scheme in a wireless access system, the method performed by a transmitter and comprising:
configuring, by the transmitter, a first block including desired signals and interference signals on the basis of a number of receivers within a cell and a number of reception modes of the receivers;
configuring, by the transmitter, a second block including either the desired signals or the interference signals;

configuring, by the transmitter, alignment blocks for each of the receivers by combining the first block with the second block; and transmitting, by the transmitter, the alignment blocks to the receivers in accordance with transmission symbol patterns corresponding to the alignment blocks, wherein symbol vectors included in the alignment blocks for each of the receivers are configured to be overlapped between the receivers.

2. The method according to claim 1, wherein, if a plurality of alignment blocks are configured in a specific one of the receivers, transmission symbol patterns for the plurality of alignment blocks are configured not to be overlapped with one another.

3. The method according to claim 1, wherein the first block has a length of $l_{block1}$ calculated as expressed by the following Equation, $$l_{block1} = \prod_{k=1}^{K}(m_k - 1),\quad \text{[Equation]}$$

where K represents the number of the receivers, and $m_k$ represents the number of reception modes of the kth receiver.

4. The method according to claim 3, wherein the number of symbol vectors included in the first block is calculated as expressed by the following Equation, $$\text{\# of symbols} = \frac{N_{block1}}{m_k - 1},\quad \text{[Equation]}$$

where $N_{block1}$ represents a number of the first blocks.

5. The method according to claim 4, wherein the second block has a length of $l_{block2}$ calculated as expressed by the following Equation, $$l_{block2} = \sum_{i=1}^{K} \frac{N_{block1}}{m_i - 1} = \sum_{i=1}^{K} \frac{\prod_{k=1}^{K}(m_k - 1)}{m_i - 1} = \left\{\prod_{k=1}^{K}(m_k - 1)\right\} \times \sum_{i=1}^{K} \frac{1}{m_i - 1},\quad \text{[Equation]}$$

where $m_i$ represents a number of modes of the ith user equipment.

6. A transmitter for transmitting a signal in accordance with an adaptive blind interference alignment (BIA) scheme in a wireless access system, the transmitter comprising:

a processor, wherein the processor supports the adaptive BIA scheme, and wherein the processor is configured to:

configure a first block, which includes desired signals and interference signals, on the basis of a number of receivers within a cell and a number of reception modes of the receivers, configure a second block, which includes either the desired signals or the interference signals, and configure alignment blocks for each of the receivers by combining the first block with the second block; and a transmission module, wherein the transmission module is configured to transmit the alignment blocks to the receivers in accordance with transmission symbol patterns corresponding to the alignment blocks, and wherein symbol vectors included in the alignment blocks for each of the receivers are configured to be overlapped between the receivers.

7. The transmitter according to claim 6, wherein, if a plurality of alignment blocks are configured in a specific one of the receivers, transmission symbol patterns for the plurality of alignment blocks are configured not to be overlapped with one another.

8. The transmitter according to claim 6, wherein the first block has a length of $l_{block1}$ calculated as expressed by the following Equation, $$l_{block1} = \prod_{k=1}^{K}(m_k - 1),\quad \text{[Equation]}$$

where K represents a number of the receivers, and $m_k$ represents the number of reception modes of the kth receiver.

9. The transmitter according to claim 8, wherein the number of symbol vectors included in the first block is calculated as expressed by the following Equation, $$\text{\# of symbols} = \frac{N_{block1}}{m_k - 1},\quad \text{[Equation]}$$

where $N_{block1}$ represents a number of the first blocks.

10. The transmitter according to claim 9, wherein the second block has a length of $l_{block2}$ calculated as expressed by the following Equation, $$l_{block2} = \sum_{i=1}^{K} \frac{N_{block1}}{m_i - 1} = \sum_{i=1}^{K} \frac{\prod_{k=1}^{K}(m_k - 1)}{m_i - 1} = \left\{\prod_{k=1}^{K}(m_k - 1)\right\} \times \sum_{i=1}^{K} \frac{1}{m_i - 1},\quad \text{[Equation]}$$

where $m_i$ represents a number of modes of the ith user equipment.

* * * * *